United States Patent
Lindsaar et al.

(10) Patent No.: US 12,326,876 B1
(45) Date of Patent: Jun. 10, 2025

(54) SYSTEMS AND METHODS FOR MANAGING WEB, MOBILE, AND POINT-OF-SALE SERVERS WITH A CUSTOMER RELATIONS MANAGEMENT SYSTEM

(71) Applicants: Mikel Lindsaar, Sydney (AU); Ben Pritchard, Sydney (AU)

(72) Inventors: Mikel Lindsaar, Sydney (AU); Ben Pritchard, Sydney (AU)

(73) Assignee: StoreConnect International Pty Ltd, Sydney (AU)

( * ) Notice: Subject to any disclaimer, the term of this patent is extended or adjusted under 35 U.S.C. 154(b) by 0 days.

(21) Appl. No.: 18/818,483

(22) Filed: Aug. 28, 2024

(51) Int. Cl.
*G06F 16/27* (2019.01)
*G06Q 30/01* (2023.01)

(52) U.S. Cl.
CPC ............ *G06F 16/27* (2019.01); *G06Q 30/01* (2013.01)

(58) Field of Classification Search
CPC ................................. G06F 16/27; G06Q 30/01
USPC .......................................................... 707/610
See application file for complete search history.

(56) References Cited

U.S. PATENT DOCUMENTS

| | | | |
|---|---|---|---|
| 6,256,634 B1 * | 7/2001 | Moshaiov | G06F 16/27 |
| 6,779,002 B1 * | 8/2004 | Mwaura | G06F 16/275 |
| | | | 707/999.203 |
| 8,572,026 B2 * | 10/2013 | Vedula | G06F 11/2097 |
| | | | 707/613 |
| 8,812,438 B2 | 8/2014 | Long | |
| 9,124,609 B2 * | 9/2015 | Alberti | H04L 67/1095 |
| 9,965,536 B2 * | 5/2018 | Shang | G06F 16/27 |
| 10,452,684 B2 | 10/2019 | Frerking | |
| 10,592,286 B2 | 3/2020 | Evenson et al. | |
| 11,172,023 B2 * | 11/2021 | Liang | G06F 9/4881 |
| 11,716,385 B2 * | 8/2023 | Karumbunathan | H04L 67/02 |
| | | | 707/610 |
| 11,893,041 B2 * | 2/2024 | Stolze | G06F 16/27 |
| 2004/0044763 A1 * | 3/2004 | Besson | G06Q 10/10 |
| | | | 709/224 |

(Continued)

FOREIGN PATENT DOCUMENTS

| | | |
|---|---|---|
| EP | 1450518 A1 | 8/2004 |
| JP | 2000056996 A | 8/1998 |
| KR | 20240032389 A | 3/2024 |

OTHER PUBLICATIONS

Moiz, Salman Abdul, et al. "Database replication: A survey of open source and commercial tools." International Journal of Computer Applications 13.6 (2011): 1-8.

(Continued)

*Primary Examiner* — Hanh B Thai

(57) ABSTRACT

Methods and systems are described for managing business interfaces including web sites, e-commerce platforms, mobile apps, and point-of-sale (POS) systems using databases and user interfaces on a customer relations management (CRM) system. Performance can be improved using two-way synchronization between the CRM database and a second database used by the business interface. Latency and efficiency can be improved by performing the synchronization using a message queue implemented with a single database table that can be replicated using a native replication mechanism. Multiple CRM databases can synchronize to a single second database organized into multiple tenants. Detection of changes in either database can be implemented using polling or change triggers.

20 Claims, 12 Drawing Sheets

(56) References Cited

U.S. PATENT DOCUMENTS

| | | | |
|---|---|---|---|
| 2004/0054690 A1* | 3/2004 | Hillerbrand | H04L 9/40 |
| 2005/0193269 A1* | 9/2005 | Haswell | G06F 11/3684 |
| | | | 714/E11.208 |
| 2005/0289198 A1* | 12/2005 | Todd | G06F 11/2097 |
| 2006/0080363 A1* | 4/2006 | Vadlamani | G06Q 10/10 |
| 2006/0080468 A1* | 4/2006 | Vadlamani | G06F 9/546 |
| | | | 709/250 |
| 2007/0156730 A1* | 7/2007 | Rothermel | G06Q 10/10 |
| 2008/0027987 A1* | 1/2008 | Arora | G06F 16/27 |
| 2008/0098044 A1* | 4/2008 | Todd | G06F 16/273 |
| 2008/0222630 A1* | 9/2008 | Taylor | G06Q 10/06 |
| | | | 707/999.102 |
| 2011/0208695 A1* | 8/2011 | Anand | G11B 27/002 |
| | | | 707/610 |
| 2011/0258136 A1* | 10/2011 | Adhiraju | G06Q 30/02 |
| | | | 705/342 |
| 2012/0010931 A1* | 1/2012 | Mehra | G06Q 30/0226 |
| | | | 705/14.27 |
| 2013/0124467 A1* | 5/2013 | Naidu | G06F 16/22 |
| | | | 707/610 |
| 2014/0040182 A1* | 2/2014 | Gilder | G06F 16/256 |
| | | | 707/602 |
| 2014/0187213 A1* | 7/2014 | Shuster | H04W 4/029 |
| | | | 455/414.1 |
| 2015/0007168 A1* | 1/2015 | Taylor | H04L 67/10 |
| | | | 717/176 |
| 2015/0052187 A1* | 2/2015 | Schultz | H04L 67/02 |
| | | | 709/203 |
| 2015/0199415 A1* | 7/2015 | Bourbonnais | G06F 16/27 |
| | | | 707/615 |
| 2018/0225345 A1* | 8/2018 | Gilder | G06F 16/273 |
| 2019/0266277 A1* | 8/2019 | Lautenschlaeger | |
| | | | G06F 16/2322 |
| 2019/0354376 A1* | 11/2019 | Delprat | G06F 9/3869 |
| 2020/0192911 A1* | 6/2020 | Hoffman | G06F 16/273 |
| 2020/0349580 A1* | 11/2020 | Gerling-Ospina | |
| | | | G06Q 20/3227 |
| 2020/0364185 A1* | 11/2020 | Beier | G06F 16/178 |
| 2020/0364241 A1* | 11/2020 | Stolze | G06F 16/2365 |
| 2021/0056120 A1* | 2/2021 | Willoughby | G06F 16/27 |
| 2021/0334246 A1* | 10/2021 | Seelemann | G06F 16/27 |
| 2023/0401183 A1* | 12/2023 | Chan | G06F 16/215 |
| 2024/0012834 A1* | 1/2024 | Terborg | G06F 11/3419 |
| 2024/0045884 A1* | 2/2024 | Lilko | G06F 16/27 |
| 2024/0176799 A1* | 5/2024 | Gunda | G06F 16/258 |
| 2024/0311259 A1* | 9/2024 | Karthik | G06F 11/1469 |
| 2024/0330318 A1* | 10/2024 | Gulledge | G06F 16/2358 |

OTHER PUBLICATIONS

Sapate, Suchit, and Minakshi Ramteke. "Survey on comparative analysis of database replication techniques." Int. J. IT, Eng. Appl. Sci. Res 2.3 (2013): 2319-4413.

\* cited by examiner

SYSTEMS AND METHODS FOR MANAGING WEB, MOBILE, AND POINT-OF-SALE SERVERS WITH A CUSTOMER RELATIONS MANAGEMENT SYSTEM

BACKGROUND OF THE INVENTION

Web site content management systems (CMSs), e-commerce platforms, commerce application programming interfaces (APIs), app APIs, and point-of-sale (POS) systems can be used as interfaces for conducting business transactions with customers and vendors for products and services. Customer relations management (CRM) systems can be used to manage business data including customer information and interactions. Using CRM management interfaces to manage multiple business interfaces can provide a single source of information for the business as well as facilitating and simplifying the end user experience.

SUMMARY OF THE INVENTION

In an embodiment, a merchant may wish to conduct business using a single source of information resident in a CRM system to drive multiple business interfaces. Managing these interfaces may include, for example, creating and maintaining a web site with a CMS, running an online business using an e-commerce platform, providing an API to support external commerce-related functions, providing an API for external apps such as mobile apps, operating a POS system in a transactional environment, or providing any other business interface that may rely on data sources for the business. The merchant may already maintain some or all of the business data sources in a CRM system, including data such as customer and vendor information, sales leads, inventory, and any other kind of data used for running the business. A CRM system may be desirable for these purposes because of its existing interfaces for importing sales leads or importing relevant vendor contact information. The merchant may be familiar with the interface for the CRM system and may be unwilling to learn how to use an additional system. The merchant may be unwilling to hire an outside firm to set up additional business interfaces, since the return can be uncertain and the interfaces may need modifications based on further experience with them. As a result, the merchant may wish to use the CRM system to set up, maintain, and administer these business interfaces. The present invention allows the merchant to do this in a convenient and economical manner while improving the efficiency and operation of the computer systems themselves.

In an illustrative example of an embodiment of the present invention, the merchant may be using the SALESFORCE™ CRM system to manage sales leads. As a result, the CRM system may already have contact information for customers, prospects, and vendors, product pricing and availability information, product description, pricing, and availability information, and ordering and accounting information, along with other information related to the business. The merchant can install the present invention as an add-on to the CRM system and can then use the interface of the add-on to design an e-commerce site. The customization can take the form of modifying values in controls describing the layout and functionality of the site, using the interface and controls of the CRM system that the merchant is already familiar with. When the site needs to reference existing data in the CRM system, such as product or pricing information, the merchant can use the existing interfaces such as searches and listings for the data. The user interface of the add-on can also contain controls for managing order processing, shipping, payment processing, tax calculation, and other functions that are necessary for the e-commerce site but may not yet have supporting data in the CRM system. In this way, the merchant can avoid the requirement to maintain multiple copies of the same data in different systems, and can also avoid the overhead of learning the operation of a completely different interface for the e-commerce site management.

Although the previous example described the management of an e-commerce site, additional embodiments of the present invention can include additional add-ons, or additional features in the same add-on, for setting up and managing other business interfaces. These interfaces can include a CMS for creating and managing a web site with fewer or no commerce functions, a third-party e-commerce platform for managing e-commerce sites, a commerce API to provide programmatic services with the business, a mobile API to support mobile apps for online business, a POS system for use in transactional environments such as retail stores, restaurants, and trade show floors, or any other kind of business interface that can benefit from the data stored in the CRM. As another specific illustrative example of an embodiment of the present invention, the merchant using the same CRM system may want to set up a point-of-sale (POS) system in order to improve the efficiency of sales, accounting, inventory management, and other sales functions. The POS systems can be used in retail stores, restaurants, trade show floors, or any other environment with sales transactions. The merchant can purchase the POS hardware from a supplier and can then install the present invention as an add-on to the CRM system and enable the POS functionality. New options may appear in the CRM system to connect and set up the POS hardware and configure it for use with an additional interface that can be set up by the present invention. The options can also help the merchant set up additional data for POS operation that may not be in the CRM system, such as discount offers, down payments, payment processing, tax calculation and other functions. When the POS interface needs to reference existing data in the CRM system, such as product or pricing information, the merchant can use the existing interfaces such as searches and listings for the data. In this way, the merchant can avoid the requirement to maintain multiple copies of the same data in different systems, and can also avoid the overhead of learning the operation of a completely different interface for the POS systems.

At least one aspect of the present disclosure is directed to a method for synchronizing a first database and a second database. In some embodiments, the method can store the first database in a first memory of a first computing device, and the second database in a second memory of a second computing device. The method can detect a first update to the first database. The method can create, based on the detecting, a first message queue item. The method can insert the first message queue item into a first message queue database on the first computing device. The method can replicate the first message queue item from the first message queue database to a second message queue item in a second message queue database on the second computing device. The method can select the second message queue item from the second message queue database. The method can update, based on the selecting, the second database to correspond to the first update.

In some embodiments, the method can additionally detect a second update to the second database. The method can additionally create, based on the detecting of the second update, a third message queue item. The method can additionally insert the third message queue item into the second message queue database. The method can additionally replicate the third message queue item from the second message queue database to a fourth message queue item in the first message queue database. The method can additionally select the fourth message queue item from the first message queue database. The method can additionally update, based on the selecting of the fourth message queue item, the first database to correspond to the second update.

In some embodiments, the first update can be selected from the group consisting of a change to a value in the first database, an insertion of a first record into the first database, a deletion of a second record from the first database, an addition to a schema of the first database, and a deletion from the schema of the first database.

In some embodiments, the second update can be selected from the group consisting of a change to a value in the second database, an insertion of a first record into the second database, a deletion of a second record from the second database, an addition to a schema of the second database, and a deletion from the schema of the second database.

In some embodiments, the detecting of the first update can comprise receiving a trigger based on an external input. The updating of the second database can comprise a full synchronization of the first database and the second database.

In some embodiments, the detecting of the second update can comprise receiving a trigger based on an external input. The updating of the first database can comprise a full synchronization of the first database and the second database.

In some embodiments, the method can additionally access the first database by a customer relationship management system. The method can additionally access the second database by an e-commerce system.

In some embodiments, the method can additionally access the first database by a customer relationship management system. The method can additionally access the second database by a point-of-sale system.

In some embodiments, the detecting can comprise a first polling of the first database, a second polling of the first database, and detecting, based on a difference between the first polling and the second polling, the first update.

In some embodiments, the detecting can comprise receiving, based on an access to the first database, a trigger, determining, based on the trigger, a change to the first database, and detecting, based on the determination, the first update.

In some embodiments, the method can additionally configure, in the second database, using the customer relationship management system, a function of the e-commerce system selected from the group consisting of a page layout, a product list, a product description, an addition to a cart, a product discount, a checkout, an account management, and an order display.

In some embodiments, the method can additionally configure, in the first database, using the customer relationship management system, a function of a business selected from the group consisting of a dashboard, a product detail, a pricing model, a stock level, a cross selling opportunity, a tax rate, a customer account, and a vendor account.

BRIEF DESCRIPTION OF THE DRAWINGS

The accompanying drawings are not intended to be drawn to scale. Where a single drawing spans multiple sheets, connectors between the sheets are labeled with a letter. For the purposes of clarity, not every component may be labeled in every drawing. In the drawings.

DETAILED DESCRIPTION

Figure 1:
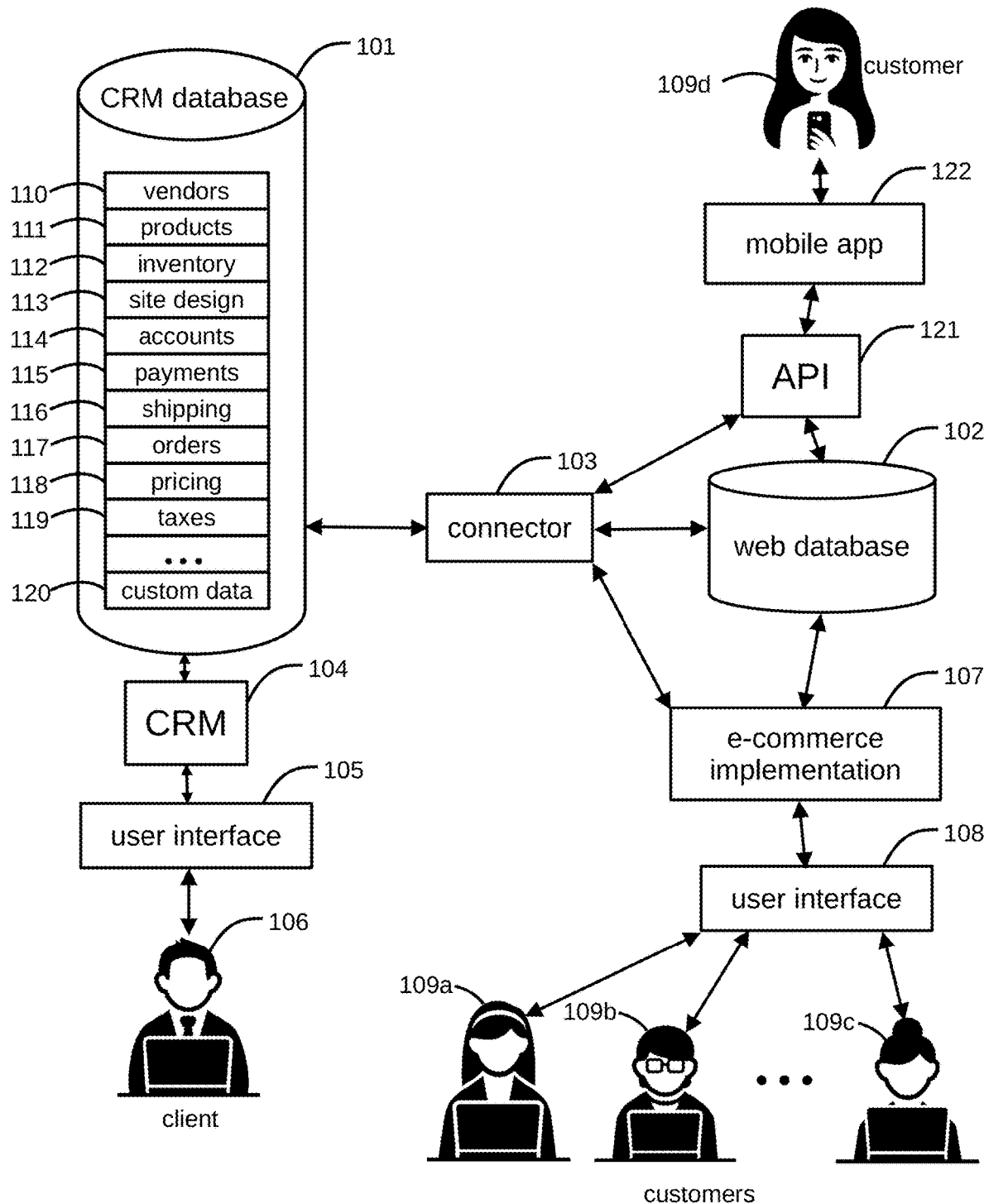
FIG. 1 is a block diagram illustrating the use of a CRM system to manage a web server, in accordance with some embodiments of the present invention.

In an embodiment, the present invention can provide a client of a customer relations management (CRM) system with the ability to use the CRM interface to set up, manage, and monitor a web site. The web site can include features commonly required for e-commerce systems, such as the management of products, inventory, user accounts, payment processing, shipping, order tracking, pricing, discounts, promotions, advertising, taxes, shopping carts, user communications, and customer support. Using the CRM interface can make the client more productive by eliminating the need to learn a different user interface to manage the web site. Maintaining customer and vendor information in the CRM system can help to avoid the time consuming and error prone task of keeping two versions of the information in two different systems and ensuring that changes happen in both places. Using only the CRM vendor for data management can improve security by reducing the attack profile and leveraging the vendor's cybersecurity infrastructure. This improved security can also simplify compliance and regulatory issues for the client. Using a single system can reduce costs for the client by eliminating the need to pay for a separate web site management system. Beyond basic security, the use of a single database can simplify the requirements for special handling of personally identifiable information (PII) and sensitive financial information such as credit card numbers and card verification value (CVV) information.

In an embodiment, the web site implementation may use a local temporary database to improve performance. This web database can cache data so that the web server does not need to access the CRM database for every operation, which can reduce the load on the CRM database when read operations outnumber write operations, as can be typical for a web site or e-commerce site. The web database can be synchronized with the CRM database using a connector. The synchronization can operate in both directions, transmitting changes in the CRM database to updates in the web database and transmitting changes in the web database to updates in the CRM database. These bi-directional updates can include changes to existing records, deletion of records, insertion of new records, creation of new entries in the database schema, deletion of existing entries in the database schema, or any other kind of change to the database.

In an embodiment, the CRM system can be a multi-tenant system supporting one or more clients. This can be done using a connector between the CRM databases and the web database such as HEROKU™ that can support multi-tenant databases and can maintain the correct relationship between the tenants in the CRM system and the tenants in the web database. One client can also use multiple tenants to support multiple web sites. The multiple tenant CRM databases can be independent and isolated from each other, even if there is a single underlying database implementation. The isolation can allow the tenant databases to be modified without interfering with each other. Each web site implementation can use a local temporary web database to cache data so that the web server does not need to access the CRM tenant database for every operation, which can reduce the load on the CRM database when read operations outnumber write operations, as can be typical for a web site or e-commerce site. Each independent CRM tenant database can be synchronized with a separate tenant in the web database using a connector such as HEROKU™ configured for the multi-tenant databases, and the separate web database tenants can be used to implement separate web sites for independent clients with independent groups of customers. The synchronization can operate in both directions, transmitting changes in each tenant CRM database to updates in the corresponding web database tenant and transmitting changes in each web database tenant to updates in the corresponding CRM database. These bi-directional updates can include changes to existing records, deletion of records, insertion of new records, creation of new entries in the database schema, deletion of existing entries in the database schema, or any other kind of change to the database. The resulting configuration with a single web database may decrease the overhead and the expense associated with maintaining multiple web sites.

In an embodiment, the connector can implement synchronization between the CRM database and web database by maintaining two message queues. The first message queue can be a list of changes that have been made in the CRM database that need to be applied to the web database. The second message queue can be a list of changes that have been made in the web database that need to be applied to the CRM database. The changes in the CRM database and in the web database can include changes to existing records, deletion of records, insertion of new records, creation of new entries in the database schema, deletion of existing entries in the database schema, or any other kind of change to the CRM database or web database. The process for determining changes in a database to enter into a message queue can be a polling process that compares a previous state of the database with a next state, an event-based process that computes changes based on the commands applied to the database, a combination of the polling and event-based processes, or any other method of determining changes in a database. The process for determining changes in the CRM database may be the same as or different from the process for determining changes in the web database. Entries can be added to a message queue based on the changes in a first database, then removed from the message queue in the same order and applied to a second database as updates. The updates at the second database can generate conflicts, which can be stored for later processing.

In an embodiment, the connector may be implemented as part of the CRM system and may be a mechanism for interfacing the CRM system to external databases. Native connector implementations can have shortcomings that can impair the effectiveness of using the CRM interface for managing a web site. For example, the polling period for updates can be lengthy, which can result in a client having to wait to see updates in the web site after making changes in the CRM system, or having to wait for customer activity on the web site to show up in the CRM system. Conflicts that arise during updates of either the CRM database or web database may not be easily accessible to a client and may require the intervention of an administrator of the CRM system or the web server. The cost of the synchronization operation may be billed based on the total size of the CRM database being synchronized, which may continue to grow over time as more orders are processed on an e-commerce system. This can result in an expense that increases proportionally to the total amount of business transacted rather than the revenue currently being generated. The synchronization operation can have arbitrary limits on the number of database tables that can be synchronized, and this can put arbitrary limits on the functionality of the CRM system in managing web sites. These limitations can be exacerbated in a multi-tenant configuration, where each tenant may be represented using a separate database table. The configuration for which tables and columns are synchronized may be represented using control files that are difficult for clients to understand and modify, or may not even be available for modification by clients, and as a result, changing the data that is managed by the CRM system for the web site may be difficult or impossible for a client.

In an embodiment, the present invention can address the limitations described above for a connector that is built into the CRM system. The message queues can be stored in a separate table in the CRM database that can be replicated in the web database and synchronized with the table in the CRM database using the native connector previously described. Custom code on the CRM system can create entries in the appropriate message queue when an update is made to the CRM database and can process entries in the message queue to apply updates to the CRM database. Similarly, custom code on the web server can create entries in the appropriate message queue when an update is made to the web database and can process entries in the message queue to apply updates to the web database. Since there is only one table with relatively few rows managing the message queues, any polling interval for the native connector can be made short, any limit on the number of synchronized tables can be avoided, and the cost for the connector can be held to a fixed amount since the amount of data being synchronized does not increase over time. Conflicts that arise during update operations on the databases can be managed by the custom code, and can therefore be displayed and resolved in the user interface for the CRM system, where the client can resolve them. Messages in the message queue can include operations for creating, deleting, and modifying database tables, as well as adding or removing tables from synchronization, and as a result, the configuration for managing the database operations can be reflected in the CRM interface where it is available to the client.

In an embodiment, the message queues can be implemented in a single database table with one row per message. Each message can contain a selection indicator that indicates which database or databases should be updated, a timestamp or other sequencing indicator, a message body describing the update, and any other information needed to process the messages in the queue. The message body can be stored as multiple columns in the table. The message body can be stored as a single text item that may be a JavaScript Object Notation (JSON) entity describing the update. A row representing a message can be deleted from the table once it is successfully processed as an update to the appropriate database. Conflicts that arise during processing a message can be stored in a database table, which may be the same table that is used for the message queues. The updates stored in a message queue can include changes to existing database records, deletion of database records, insertion of new database records, creation of new entries in the database schema, deletion of existing entries in the database schema, or any other kind of change to the database.

In an embodiment, the present invention improves the functioning of the computer itself. By implementing a message queue using a replicated table, the invention can avoid the need to poll and replicate multiple tables between the databases being synchronized. This can result in less overhead, shorter delays in updates, and more flexibility in allowing the structure of the database to be modified on the fly. The invention itself is not directed to an abstract idea, but is instead directed to a specific improvement to the way computers operate, embodied in the implementation of a message queue using a database table that is replicated across databases. The present invention does not simply add conventional computer components to well-known business practices, nor does it simply use conventional computer steps to carry out a well-known process.

Turning to the drawings, FIG. 1 is a block diagram illustrating the use of a CRM system to manage a web server, in accordance with some embodiments of the present invention. CRM database 101 can be managed by CRM system 104 and can represent data relevant to managing an online business, including information about vendors 110, products 111, inventory 112, accounts 114, payments 115, shipping 116, orders 117, pricing 118, taxes 119, and any additional custom data 120 relevant to the business. A client 106 can be involved in managing the business and can use a user interface 105 to interact with the CRM system 104 that can provide access to the data 110-120 in the CRM database 101. The user interface 105 to the CRM system 104 can be controlled through a web browser, but can also be controlled through an app, or by using any other method.

The client 106 can also manage an e-commerce site for customers 109a-109c to transact with the business through an e-commerce implementation 107 using a user interface 108. The user interface 108 can be controlled through a web browser, but can also be controlled through an app, or by using any other method. The e-commerce implementation 107 can use a web database 102 that can be maintained as a replica or partial replica of the CRM database 101, and can improve the performance of the e-commerce implementation 107 by allowing faster local access to information 110-120 that is stored in the CRM database. Connector 103 can ensure that the CRM database 101 and web database 102 are maintained as replicas or partial replicas, so that a change in the information 110-120 in the CRM database 101 updates some or all of the web database 102 with the same change, and that a change in the web database 102 updates some or all of the CRM database 101 with the same change.

It should be noted that the web database 102 is optional. The e-commerce implementation 107 can operate by directly accessing the information 110-120 in the CRM database 101. The web database 102 can provide caching and a performance improvement, especially in the case where more read operations than write operations are done by the e-commerce implementation 107, using either the CRM database 101 or the web database 102.

The site design information 113 can be used by the e-commerce implementation 107 to parametrically control the look and feel of the user interface 108 that is presented to the customers 109a-109c. In this way, the client 106 can set up and modify the appearance and function of the user interface 108 without needing detailed knowledge of how the e-commerce implementation 107 works.

The client 106 can also manage a mobile app 122 that a customer 109d can use for e-commerce transactions with the business. An API 121 can provide similar functionality to that of the e-commerce implementation 107, and the mobile app 122 can provide similar functionality to that of the user interface 108.

In an illustrative example of an embodiment, the client 106 can configure the site design 113 to present an attractive and functional e-commerce site. The e-commerce implementation 107 can use the site design 113 either directly from the CRM database 101 or from a replicated version in the web database 102 to construct HTML code that can be served by the user interface 108 to the customers 109a-109c. A customer 109a can use a web browser to sign in, using the accounts information 114, navigate the e-commerce site, view products that are generated from the product information 111, and select a product to buy. The customer 109a can add the product to a shopping cart and enter a checkout process, thereby recording an order either directly into CRM data 117 or into the web database 102 which updates the CRM data 117 through the connector 103. The order can be built using information for products 111, shipping 116, pricing 118, taxes 119, and other information as needed. The customer 109a can interact with the e-commerce implementation 107 to complete an online payment that can be recorded in the payment information 115. The completion of the payment can initiate a fulfillment process that updates the inventory 112 and shipping 116 information using vendor 110 information and other information as needed. The customer can use the user interface 108 to track updates on the fulfillment and shipping process by accessing order 117 and shipping 116 information, as well as other information as needed.

Figure 2:
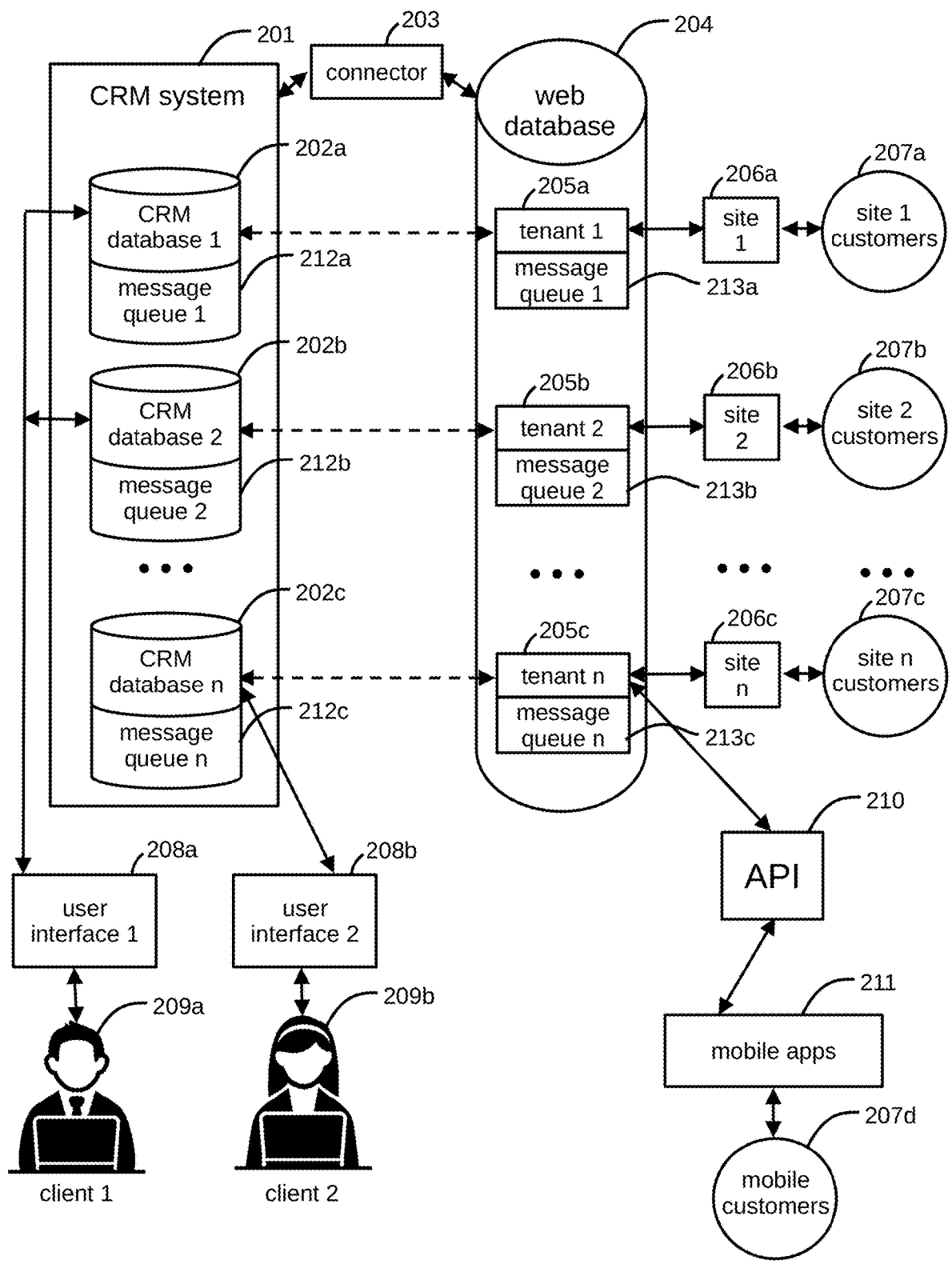
FIG. 2 is a block diagram illustrating the use of multiple CRM databases to manage a multi-tenant web database for multiple web servers, in accordance with some embodiments of the present invention.

FIG. 2 is a block diagram illustrating the use of multiple CRM databases to manage a multi-tenant web database for multiple web servers, in accordance with some embodiments of the present invention. In FIG. 2, client 1 209a can manage site 1 206*a* and site 2 206*b*, and client 2 209*b* can manage site n 206*c*. The CRM system 201 can operate CRM databases 202*a*-202*c*, each of which can represent an independent database and set of custom programming, and each of which can contain a message queue 212*a*-212*c*. Client 1 209*a* can access and manage CRM databases 202*a* and 202*b* using user interface 1 208*a*, and client 2 209*b* can access and manage CRM database 202*c* using user interface 2 208*b*.

Web database 204 can support multiple tenants 205*a*-205*c*, each of which can have a message queue 213*a*-213*c*. Each web database tenant and message queue can correspond to a CRM database and message queue, for example, tenant 1 205*a* and message queue 1 213*a* can correspond to CRM database 1 202*a* and message queue 1 212*a*, tenant 2 205*b* and message queue 2 213*b* can correspond to CRM database 2 202*b* and message queue 2 212*b*, and tenant n 205*c* and message queue n 213*c* can correspond to CRM database n 202*c* and message queue n 212*c*. The connector 203 can manage the implementation of the web database tenants 205*a*-205*c* and message queues 213*a*-213*c* in a manner to prevent interference between the tenants 205*a*-205*c* within the single web database 204.

Each tenant 205*a*-205*c* in the web database 204 may be associated with a separate web site. For example, tenant 1 205*a* may be associated with web site 206*a*, which uses information in tenant 1 205*a* to provide online services to customers 207*a*. Similarly, tenant 2 205*b* may be associated with web site 206*b*, which uses information in tenant 2 205*b* to provide online services to customers 207*b*, and tenant n 205*c* may be associated with web site 206*c*, which can use information in tenant n 205*c* to provide online services to customers 207*c*.

A tenant 205*c* can also be associated with mobile apps 211. An API 210 can provide similar functionality to that of the sites 206*a*-206*c* and the mobile apps 211 can provide a user interface to mobile customers 207*d*.

Connector 203 can ensure that the CRM databases 202*a*-202*c* and message queues 212*a*-212*c* may be maintained as replicas or partial replicas of web database 204, so that a change in one of the CRM databases 202*a*-202*c* or message queues 212*a*-212*c* updates the corresponding web database tenant 205*a*-205*c* or message queue 213*a*-213*c* with the same change, and that a change in one of the web database tenants 205*a*-205*c* or message queues 213*a*-213*c* updates the corresponding CRM database 202*a*-202*c* or message queue 212*a*-212*c* with the same change. An example of a connector that can maintain replication with multitenant databases is HEROKU™.

The CRM databases 202*a*-202*c* may correspond to the CRM database 101 depicted in FIG. 1. The web database 204 may correspond to the web database 102 depicted in FIG. 1. The connector 203 may correspond to the connector 103 depicted in FIG. 1. The message queues 212*a*-212*c* may correspond to the message queue 402 in FIG. 4 and/or the message queue 507 in FIG. 5. The message queues 213*a*-213*c* may correspond to the message queue 402 in FIG. 4 and/or the message queue 508 in FIG. 5. The web sites 206*a*-206*c* may correspond to the e-commerce implementation 107 depicted in FIG. 1. The customers 207*a*-207*d* may correspond to the customers 109*a*-109*d* depicted in FIG. 1. The CRM system 201 may correspond to the CRM system 104 depicted in FIG. 1. The clients 209*a*-209*b* may correspond to the client 106 depicted in FIG. 1. The API 210 may correspond to the API 121 depicted in FIG. 1. The mobile apps 211 may correspond to the mobile app 122 depicted in FIG. 1.

Figure 3:
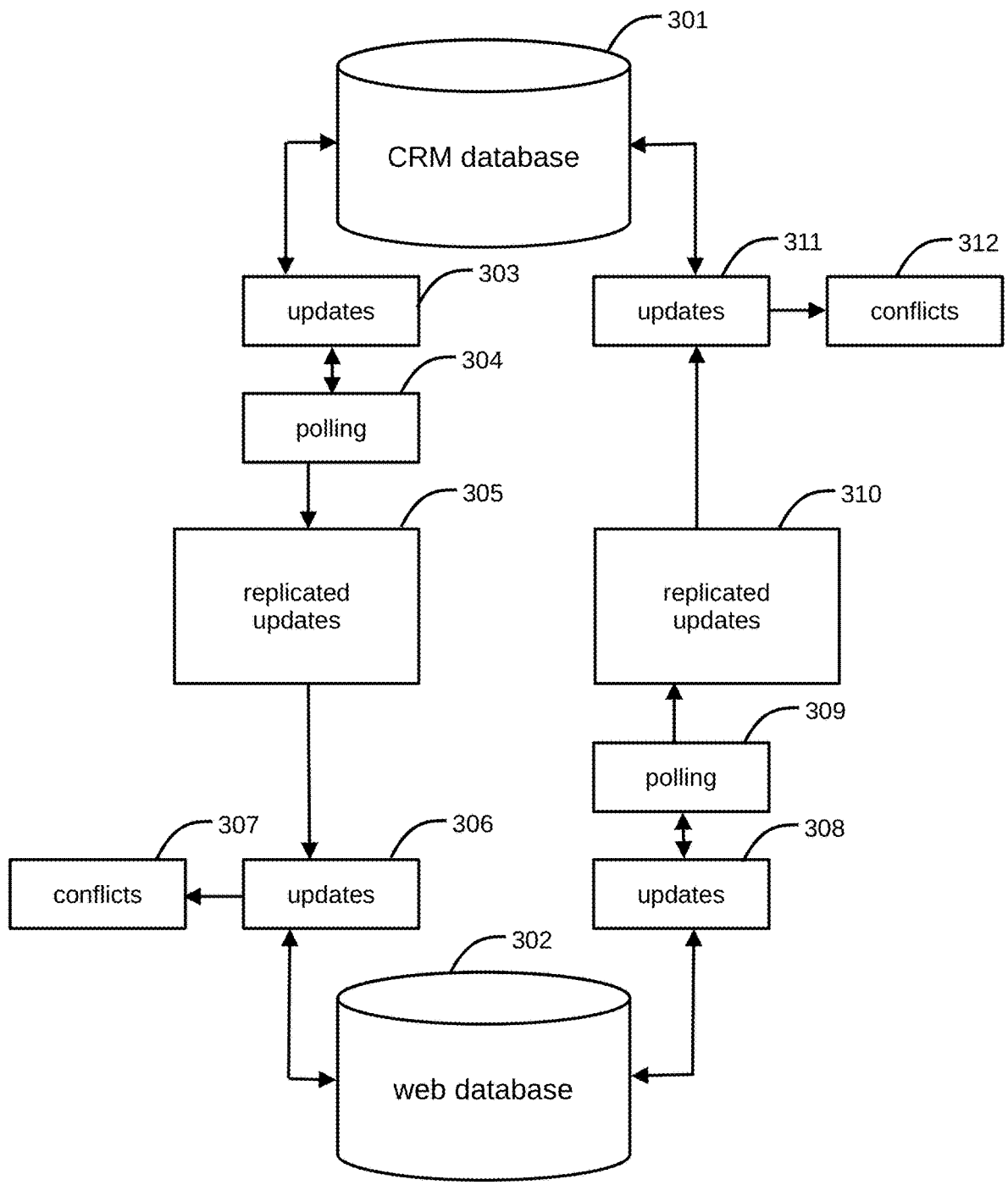
FIG. 3 is a block diagram illustrating a replication mechanism to synchronize the databases of a CRM system and a web server, in accordance with some embodiments of the present invention.

FIG. 3 is a block diagram illustrating a replication mechanism to synchronize the databases of a CRM system and a web server, in accordance with some embodiments of the present invention. CRM database 301 can be updated by an update process 303 and web database 302 can be updated independently by an update process 308. A polling process 304 can monitor the updates to CRM database 301, by either directly monitoring the update process 303 or by monitoring the CRM database 301 for changes in state from a first time to a second time. The polling process 304 can maintain a list of replicated updates 305 that need to be applied to web database 302 in order to keep it synchronized with CRM database 301. The updates 305 can include changes to existing records, deletion of records, insertion of new records, creation of new entries in the database schema, deletion of existing entries in the database schema, or any other kind of change to the database. Similarly, a polling process 309 can monitor the updates to web database 302, by either directly monitoring the update process 308 or by monitoring the web database 302 for changes in state from a first time to a second time. The polling process 309 can maintain a list of replicated updates 310 that need to be applied to CRM database 301 in order to keep it synchronized with web database 302. The updates 310 can include changes to existing records, deletion of records, insertion of new records, creation of new entries in the database schema, deletion of existing entries in the database schema, or any other kind of change to the database.

A replication update process 306 can apply the list of replicated updates 305 to the web database 302 and record any conflicts 307 that arise. For example, a conflict 307 may be detected if an update was made to the same table, row, and column in both the CRM database 301 and the web database 302, but the updated value was different in the two databases. These conflicts may need to be manually resolved at a later time. Similarly, a replication update process 311 can apply the list of replicated updates 310 to the CRM database 301 and record any conflicts 312 that arise. It should be noted that replicated updates from the update process 311 can be omitted from the updates recorded by the polling process 304, and replicated updates from the update process 306 can be omitted from the updates recorded by the polling process 309. In this way, endless cycles of updates can be avoided.

The CRM database 301 may correspond to the CRM database 101 depicted in FIG. 1. The web database 302 may correspond to the web database 102 depicted in FIG. 1.

Figure 4:
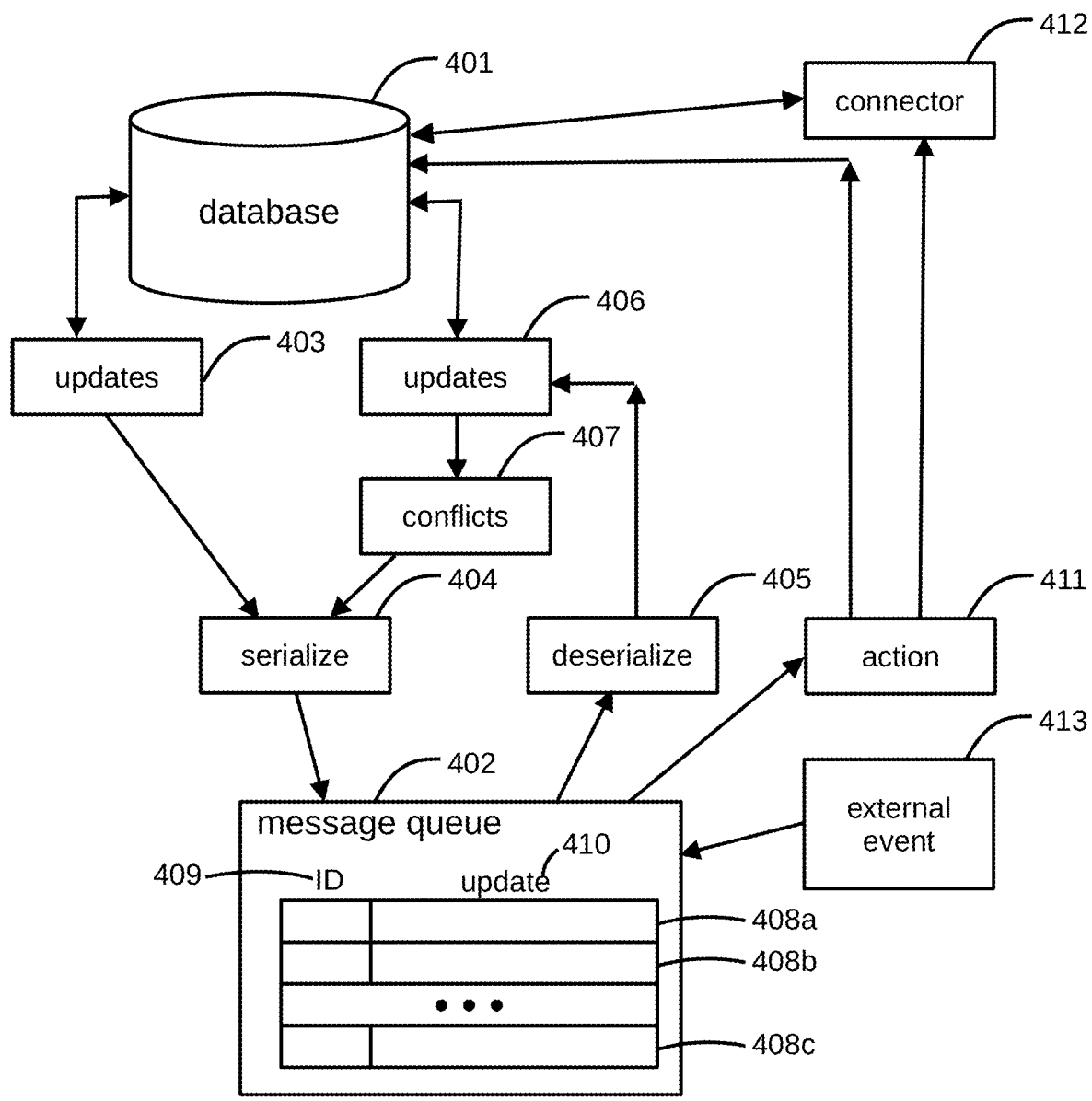
FIG. 4 is a block diagram illustrating the use of a message queue for synchronizing a database, in accordance with some embodiments of the present invention.

FIG. 4 is a block diagram illustrating the use of a message queue for synchronizing a database, in accordance with some embodiments of the present invention. Updates module 403 can monitor the updates to database 401, by either directly monitoring the updates to the database 401 or by monitoring the database 401 for changes in state from a first time to a second time. The updates can include changes to existing records, deletion of records, insertion of new records, creation of new entries in the database schema, deletion of existing entries in the database schema, or any other kind of change to the database. Updates module 403 can pass the update information to a serialize module 404 that can use the update information to create a message queue item 408*a*-408*c* to be stored in a message queue table 402 in a database, and store the message queue item 408*a*-408*c* in a new row in the message queue table 402. The message queue item 408*a*-408*c* can contain an update object 410 along with an identification object 409. For example, the update object 410 can contain in indication of the database that needs to be updated, an indication of the tenant being updated, an indication of the table being updated, an indication of the row and column being updated, an indication of the type of update, the value to use for the update, a database command to use for the update, or any other type of update information. As a further example, the identification object 409 can contain a sequence number, a timestamp, an indication of the database that changed, an indication of the database that needs to be updated, addressing information for the two databases, a priority for the update, or any other type of identification information. Deserialize module 405 can query the message queue table 402 for messages indicating an update to database 401 and retrieve one of the message queue items 408a-408c. The deserialize module 405 can extract information from the identification object 409 and the update object 410 and pass this information to an update module 406 which can in turn apply the update to database 401. If any conflicts 407 arise in the update, the update module 406 can pass the conflict information 407 to the serialize module 404 to record the conflicts in the message queue table 402 to be retrieved and managed later by a conflict resolution module (not shown).

Entries into the message queue table 402 can also be made as a result of an external event 413. Examples of an external event can include a user-initiated event such as selection of a user interface control, a scheduled event such as one based on a timer, a network event such as a connection from an external source, a logical event received through a programming API, a trigger generated by executable code, or any other kind of external event. An entry from the message queue 402 can also be directly decoded into an action 411 rather than being deserialized into an update 406 as previously described. The resulting action 411 can be applied to the database 401 or the connector 412. For example, the action 411 can be a request for the connector 412 to initiate a full synchronization involving the database 401. As an illustrative example, this request for a full synchronization can be done to manually correct the situation where a CRM database and web database have gotten out of sync due to an unforeseen operational or software error, and can provide a user-operated control to override the normal incremental synchronization and instead do a full synchronization.

The database 401 may correspond to the CRM database 101 depicted in FIG. 1. The database 401 may also correspond to the web database 102 depicted in FIG. 1. Updates module 403 may correspond to the polling module 304 or the polling module 309 depicted in FIG. 3. The message queue table 402 may correspond to the replicated updates 305 or the replicated updates 310 depicted in FIG. 3. The updates module 406 may correspond to the updates module 306 or the updates module 311 depicted in FIG. 3. The conflicts 407 may correspond to the conflicts 307 or the conflicts 312 depicted in FIG. 3. The connector 412 may correspond to the connector 103 depicted in FIG. 1.

Figure 5:
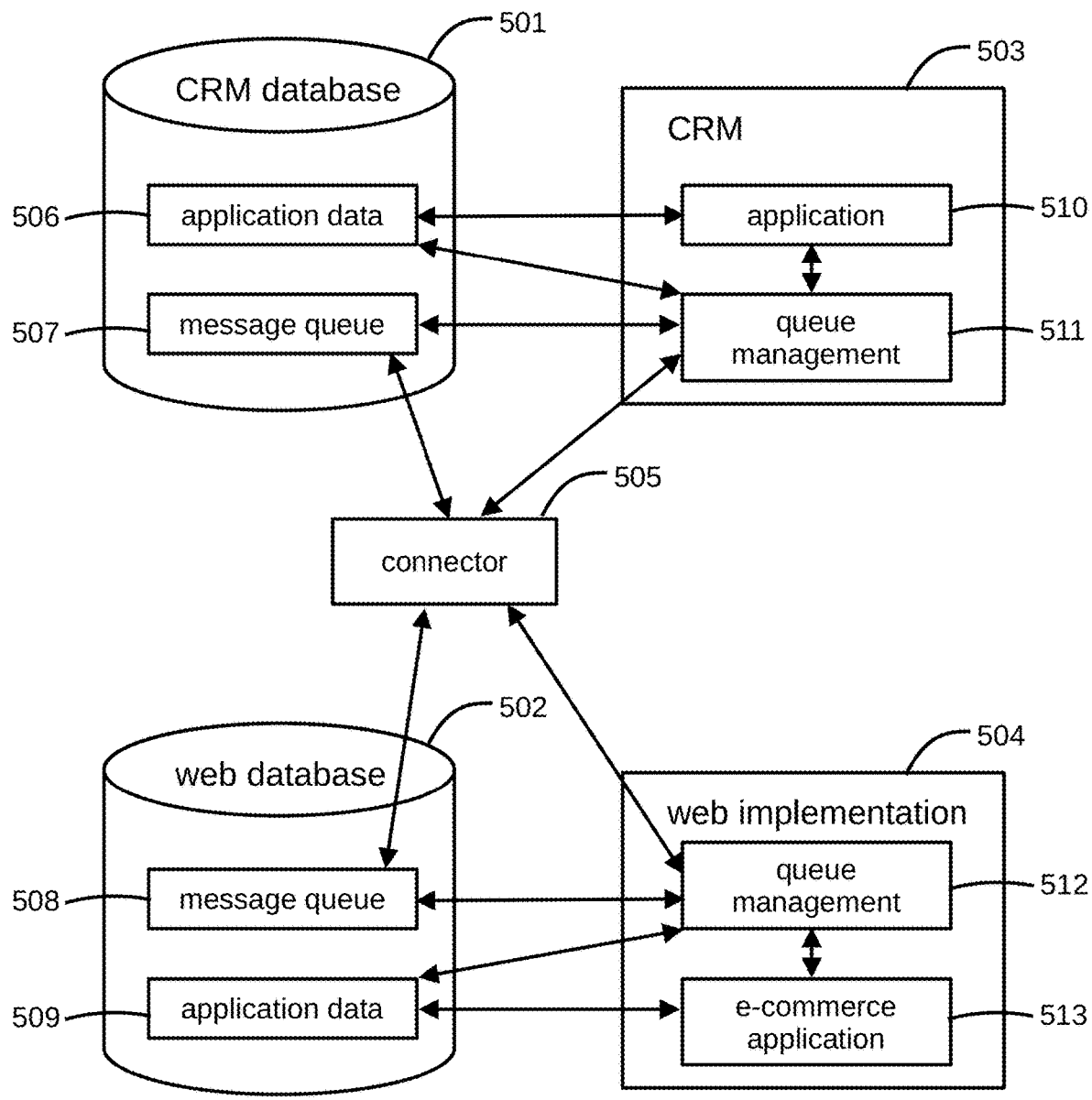
FIG. 5 is a block diagram illustrating the use of replicated message queues to synchronize the databases of a CRM system and a web server, in accordance with some embodiments of the present invention.

FIG. 5 is a block diagram illustrating the use of replicated message queues to synchronize the databases of a CRM system and a web server, in accordance with some embodiments of the present invention. CRM database 501 can contain both application data 506 and a message queue table 507. Web database 502 can contain both application data 509 and a message queue table 508. Connector 505 can synchronize message queue table 507 and message queue table 508 so that they contain corresponding data. Custom code in the CRM system 503 can implement an application 510 to manage the use of the application data 506, and can also have a queue management module 511 that manages the message queue 507 as described previously to update the application data 506 to correspond to any changes in the application data 509 in the web database 502. Note that the application data 506 may not be updated to exactly match the application data 509; for example, the application data 506 can be encrypted, or can have additional data computed from it, or can be derived in some other manner from the data from the application data 509, so a formatting step may additionally prepare the change in the application data 509 to update the application data 506. The message queue 507 can also contain actions resulting from external events as described with respect to FIG. 4, and can control the queue management module 511 based on these actions. The queue management module 511 can also signal the application code 510 if desired, to provide an indication of when the application data 506 has changed as a result of synchronization. The queue management module 511 can also initiate actions by the connector 505, as described with respect to FIG. 4. Similarly, custom code in the web implementation 504 can implement an e-commerce application 513 to manage the use of the application data 509, and can also have a queue management module 512 that manages the message queue 508 as described previously to update the application data 509 to correspond to any changes in the application data 506 in the CRM database 501. Note that the application data 509 may not be updated to exactly match the application data 506; for example, the application data 509 can be encrypted, or can have additional data computed from it, or can be derived in some other manner from the data from the application data 506, so a formatting step may additionally prepare the change in the application data 506 to update the application data 509. The message queue 508 can also contain actions resulting from external events as described with respect to FIG. 4, and can control the queue management module 512 based on these actions. The queue management module 512 can also signal the e-commerce application code 513 if desired, to provide an indication when the application data 509 has changed as a result of synchronization. The queue management module 512 can also initiate actions by the connector 505, as described with respect to FIG. 4. Note that the updates to the application data 506 and the application data 509 can include changes to existing records, deletion of records, insertion of new records, creation of new entries in the database schema, deletion of existing entries in the database schema, or any other kind of change to the CRM database 501 or the web database 502.

CRM database 501 may correspond to the CRM database 101 depicted in FIG. 1. Web database 502 may correspond to the web database 102 depicted in FIG. 1. Message queue table 507 and message queue table 508 may correspond to the message queue table 402 depicted in FIG. 4. Application data 506 and application data 509 may correspond to the data 110-120 depicted in FIG. 1. E-commerce application 513 may correspond to the e-commerce implementation 107 depicted in FIG. 1.

Figure 6:
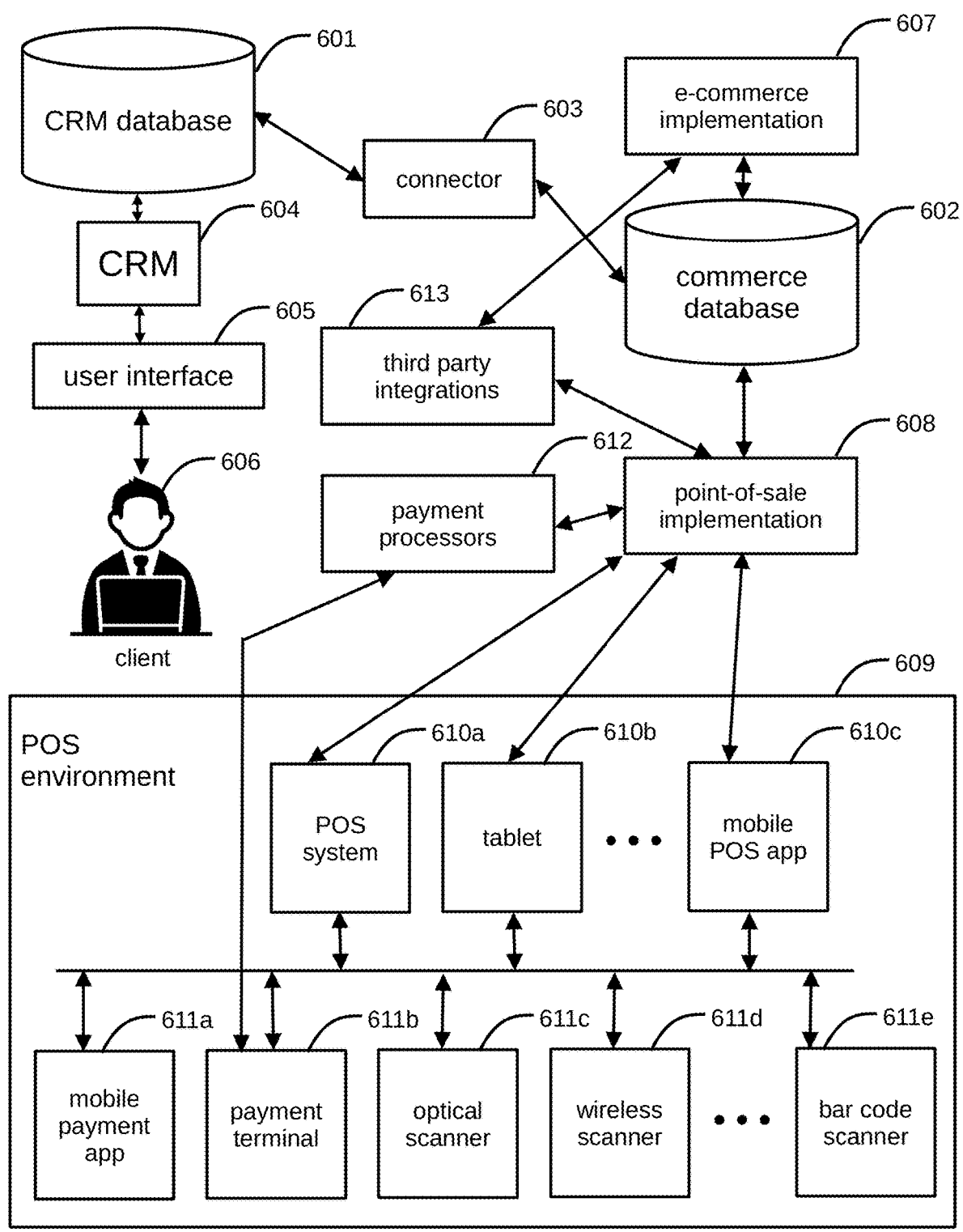
FIG. 6 is a block diagram illustrating the use of a CRM system to manage a POS system, in accordance with some embodiments of the present invention.

FIG. 6 is a block diagram illustrating the use of a CRM system to manage a POS system, in accordance with some embodiments of the present invention. Client 606 can manage CRM database 601 of CRM system 604 using user interface 605. CRM database 601 can store information used for managing transactions in a POS environment 609. The POS environment 609 can be a retail store, restaurant, trade show floor, or any other environment where a POS can be used to manage transactions, and can use multiple types of point-of-sale terminals such as a dedicated POS system 610a, a tablet 610b running a POS app, or a mobile device 610c such as a smartphone running a POS app. The POS terminals 610a-610 can access services and devices such as a mobile payment app 611a, a payment terminal 611b, an optical scanner 611c, a wireless scanner 611d, or a bar code scanner 611e. The access may be through any kind of connection, including wired and wireless connections. The POS terminals 610a-610c can access a POS implementation 608 that can use a commerce database 602 to operate. The commerce database 602 can be fully or partially synchronized with the CRM database 601 through a connector 603. The connector 603 can achieve this full or partial synchronization using the techniques described with respect to FIG. 2, FIG. 3, FIG. 4, and FIG. 5. Separately, an online e-commerce implementation 607 may also utilize the commerce database 602. The POS implementation 608 may utilize one or more payment processors 612 in order to process financial transactions. The payment terminal 611b can also utilize one or more payment processors 612 in order to process financial transactions. Both the POS implementation 608 and the e-commerce implementation 607 can utilize one or more third party integrations 613 in order to implement additional transaction functions. For example, third party integrations 613 can provide functions for shipping, billing, inventory management, customer support, vendor ordering, tax accounting, or any other functions supporting commerce transactions.

The CRM database 601 may correspond to the CRM database 101 depicted in FIG. 1. The commerce database 602 may correspond to the web database 102 depicted in FIG. 1. The connector 603 may correspond to the connector 103 depicted in FIG. 1. The CRM system 604 may correspond to the CRM system 104 depicted in FIG. 1. The user interface 605 may correspond to the user interface 105 depicted in FIG. 1. The e-commerce implementation 607 may correspond to the e-commerce implementation 107 depicted in FIG. 1.

Figure 7:
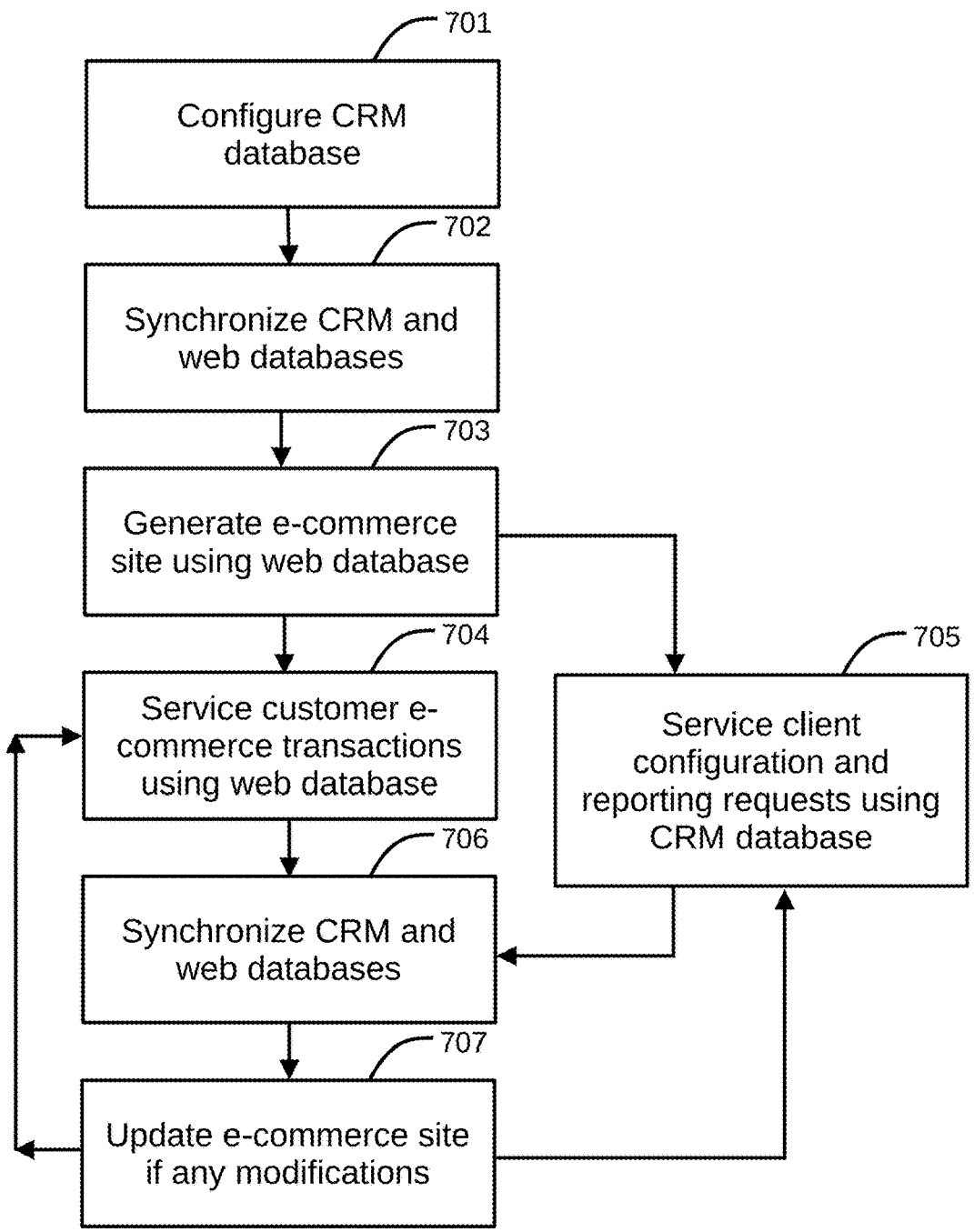
FIG. 7 is a flowchart illustrating the process of using a CRM system to manage a web server, in accordance with some embodiments of the present invention.

FIG. 7 is a flowchart illustrating the process of using a CRM system to manage a web server, in accordance with some embodiments of the present invention. In step 701, the CRM database can be initially configured for use. This can be done using a template, with an automated process, with a manual process by the client through a user interface, or using a combination of these and other means. In step 702, the CRM database can be partially or fully synchronized with a web database, which can be done using the methods previously described with respect to FIG. 2, FIG. 3, FIG. 4, and FIG. 5. In step 703, the web database can be used to generate an e-commerce site, which can use configuration parameters from the web database to control the look and feel of the site, and can use other information from the web database to control the content of the site. In step 704, customers can interact with the e-commerce site using a web-based user interface, a dedicated app, or any other kind of interface, and as a result can find information and complete transactions. These operations can update the web database. At the same time, in step 705, the client can interact with the CRM database using a web-based user interface, a dedicated app, or any other kind of interface, and as a result can find information, modify data, and modify configuration. These operations can update the CRM database. In step 706, the CRM database and web database can be partially or completely synchronized with each other. In step 707, the e-commerce site can be updated based on any changes in the web database that require updates. Steps 704-707 can be repeated to implement ongoing operations.

The CRM database mentioned in steps 701, 702, 705, and 706 can correspond to the CRM database 101 depicted in FIG. 1. The web database mentioned in steps 702, 703, 704, and 706 can correspond to the web database 102 depicted in FIG. 1. The e-commerce site mentioned in steps 703, 704, and 707 can correspond to the e-commerce implementation 107 depicted in FIG. 1. The synchronization operation mentioned in steps 702 and 706 can correspond to the connector 103 depicted in FIG. 1.

Figure 8A:
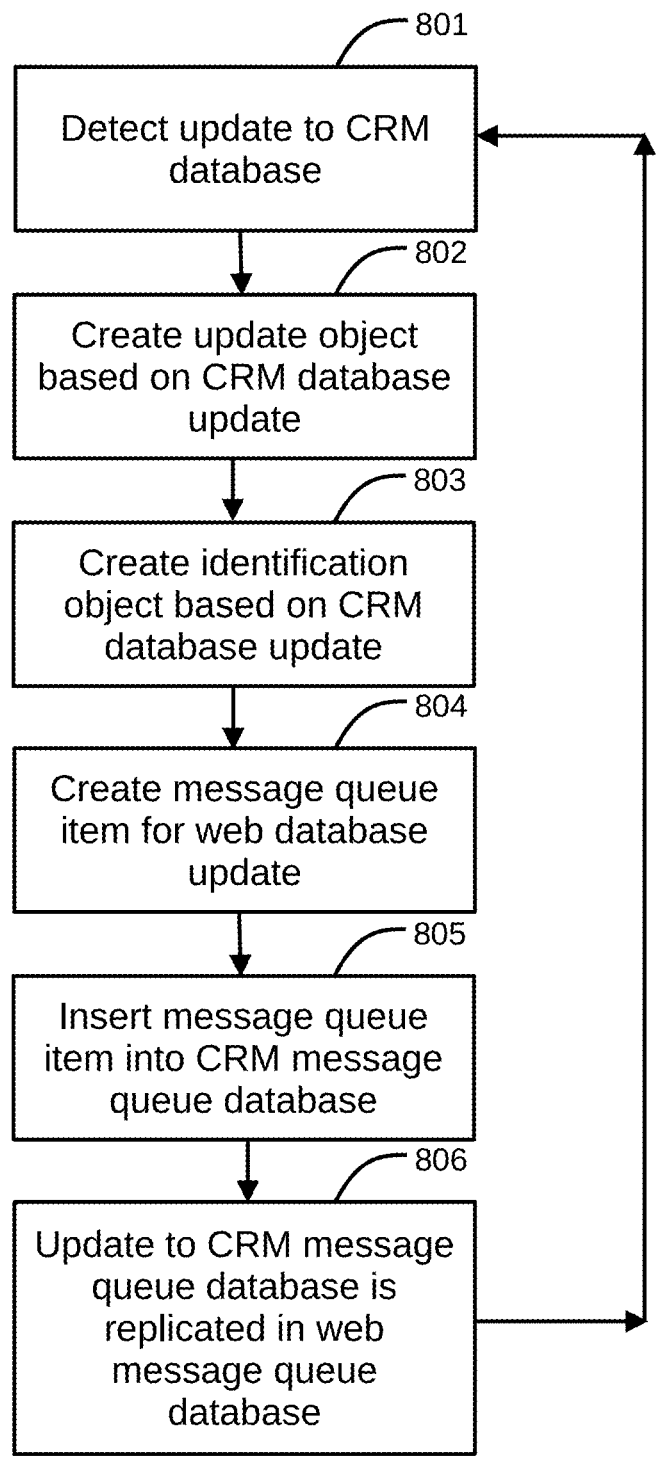
FIG. 8A is a flowchart illustrating the process of using a replicated table as a message queue to propagate changes made in a CRM database to a web database, in accordance with some embodiments of the present invention.

FIG. 8A is a flowchart illustrating the process of using a replicated table as a message queue to propagate changes made in a CRM database to a web database, in accordance with some embodiments of the present invention. In step 801, an update to the CRM database can be detected. For example, the detection may be as a result of a polling operation determining a change in the CRM database, or it may be done as a result of directly monitoring operations that change the CRM database. The update to the CRM database can include changes to existing records, deletion of records, insertion of new records, creation of new entries in the database schema, deletion of existing entries in the database schema, or any other kind of change to the database. In step 802, an update object can be created based on the CRM database update detected in step 801. The update object can contain an indication of the database that needs to be updated, an indication of the tenant being updated, an indication of the table being updated, an indication of the row and column being updated, an indication of the type of update, the value to use for the update, a database command to use for the update, or any other type of update information. In step 803, an identification object can be created based on the CRM database update detected in step 801. The identification object can contain a sequence number, a timestamp, an indication of the database that changed, an indication of the database that needs to be updated, addressing information for the two databases, a priority for the update, or any other type of identification information. In step 804, a message queue item can be created based on the update object created in step 802 and the identification object created in step 803, and in step 805 the message queue item created in step 804 can be inserted into the CRM message queue database. In step 806, the update to the CRM message queue database in step 805 can be replicated in the web message queue database.

The CRM database mentioned in steps 801, 802, 803, 805, and 806 can correspond to the CRM database 101 depicted in FIG. 1. The CRM message queue database mentioned in step 805 can correspond to the message queue 507 depicted in FIG. 5. The web message queue database mentioned in step 806 can correspond to the message queue 508 depicted in FIG. 5.

Figure 8B:
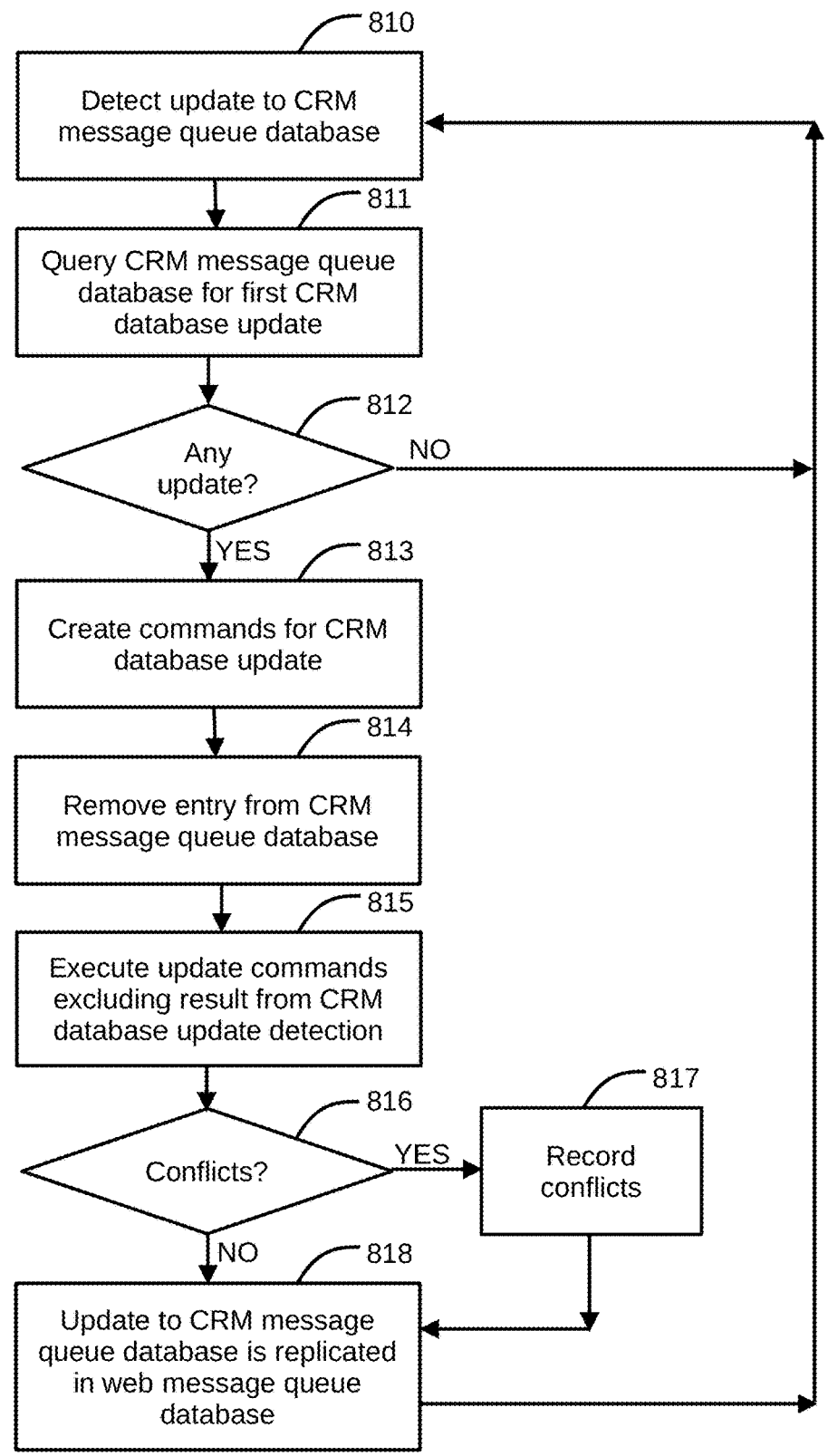
FIG. 8B is a flowchart illustrating the process of using a replicated table as a message queue to incorporate external changes from a web database into a CRM database, in accordance with some embodiments of the present invention.

FIG. 8B is a flowchart illustrating the process of using a replicated table as a message queue to incorporate external changes from a web database into a CRM database, in accordance with some embodiments of the present invention. In step 810, an update to the CRM message queue database can be detected. For example, the detection may be as a result of a polling operation determining a change in the CRM message queue database, or it may be done as a result of directly monitoring operations that change the CRM message queue database. In step 811, the CRM message queue database can be queried to select the next available update to the CRM database. In step 812, if the query from step 811 returns no result, the process can return to step 810 to await an update to the CRM message queue database, otherwise it can proceed to step 813, which can use information from the query result to create a set of commands that can make the update to the CRM database that is indicated by the result of the query in step 811. In step 814, the result returned by the query in step 811 can be removed from the CRM message queue database. In step 815, the set of commands created in step 813 can be applied to the CRM database to replicate the change that originated in the web database. The operations applied to the CRM database by these commands can be excluded from the detection process described by step 801 depicted in FIG. 8A, in order to prevent a loop from forming that repeats replication commands between the two databases. Step 816 can test for any conflicts that arise during the execution of the commands in step 815. For example, a conflict may result if the same value is updated in both the CRM database and the web database before the synchronization happens, but the update values are different in the two databases. If step 816 detects a conflict, then step 817 can record the conflict. In either case, step 818 can replicate the change made to the CRM message queue database in step 814 into the web message queue database.

The CRM database mentioned in steps 811, 813, and 815 can correspond to the CRM database 101 depicted in FIG. 1. The CRM message queue database mentioned in steps 810, 811, 814, and 818 can correspond to the message queue 507 depicted in FIG. 5. The web message queue database mentioned in step 818 can correspond to the message queue 508 depicted in FIG. 5.

Figure 8C:
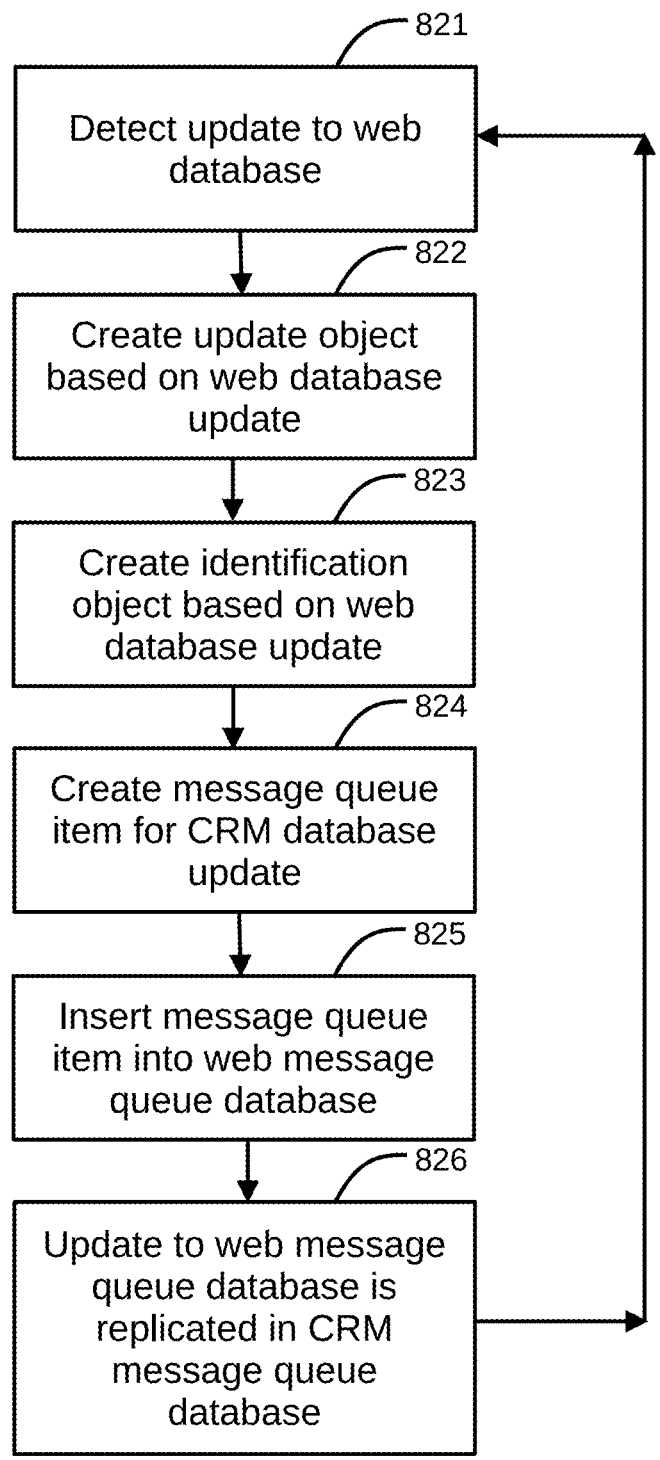
FIG. 8C is a flowchart illustrating the process of using a replicated table as a message queue to propagate changes made in a web database to a CRM database, in accordance with some embodiments of the present invention.

FIG. 8C is a flowchart illustrating the process of using a replicated table as a message queue to propagate changes made in a web database to a CRM database, in accordance with some embodiments of the present invention. In step 821, an update to the web database can be detected. The update to the web database can include changes to existing records, deletion of records, insertion of new records, creation of new entries in the database schema, deletion of existing entries in the database schema, or any other kind of change to the database. For example, the detection may be as a result of a polling operation determining a change in the web database, or it may be done as a result of directly monitoring operations that change the web database. In step 822, an update object can be created based on the web database update detected in step 821. The update object can contain an indication of the database that needs to be updated, an indication of the tenant being updated, an indication of the table being updated, an indication of the row and column being updated, an indication of the type of update, the value to use for the update, a database command to use for the update, or any other type of update information. In step 823, an identification object can be created based on the web database update detected in step 821. The identification object can contain a sequence number, a timestamp, an indication of the database that changed, an indication of the database that needs to be updated, addressing information for the two databases, a priority for the update, or any other type of identification information. In step 824, a message queue item can be created based on the update object created in step 822 and the identification object created in step 823, and in step 825 the message queue item created in step 824 can be inserted into the web message queue database. In step 826, the update to the web message queue database in step 825 can be replicated in the CRM message queue database.

The web database mentioned in steps 821, 822, 823, 825, and 826 can correspond to the web database 102 depicted in FIG. 1. The web message queue database mentioned in step 825 can correspond to the message queue 508 depicted in FIG. 5. The CRM message queue database mentioned in step 826 can correspond to the message queue 507 depicted in FIG. 5.

Figure 8D:
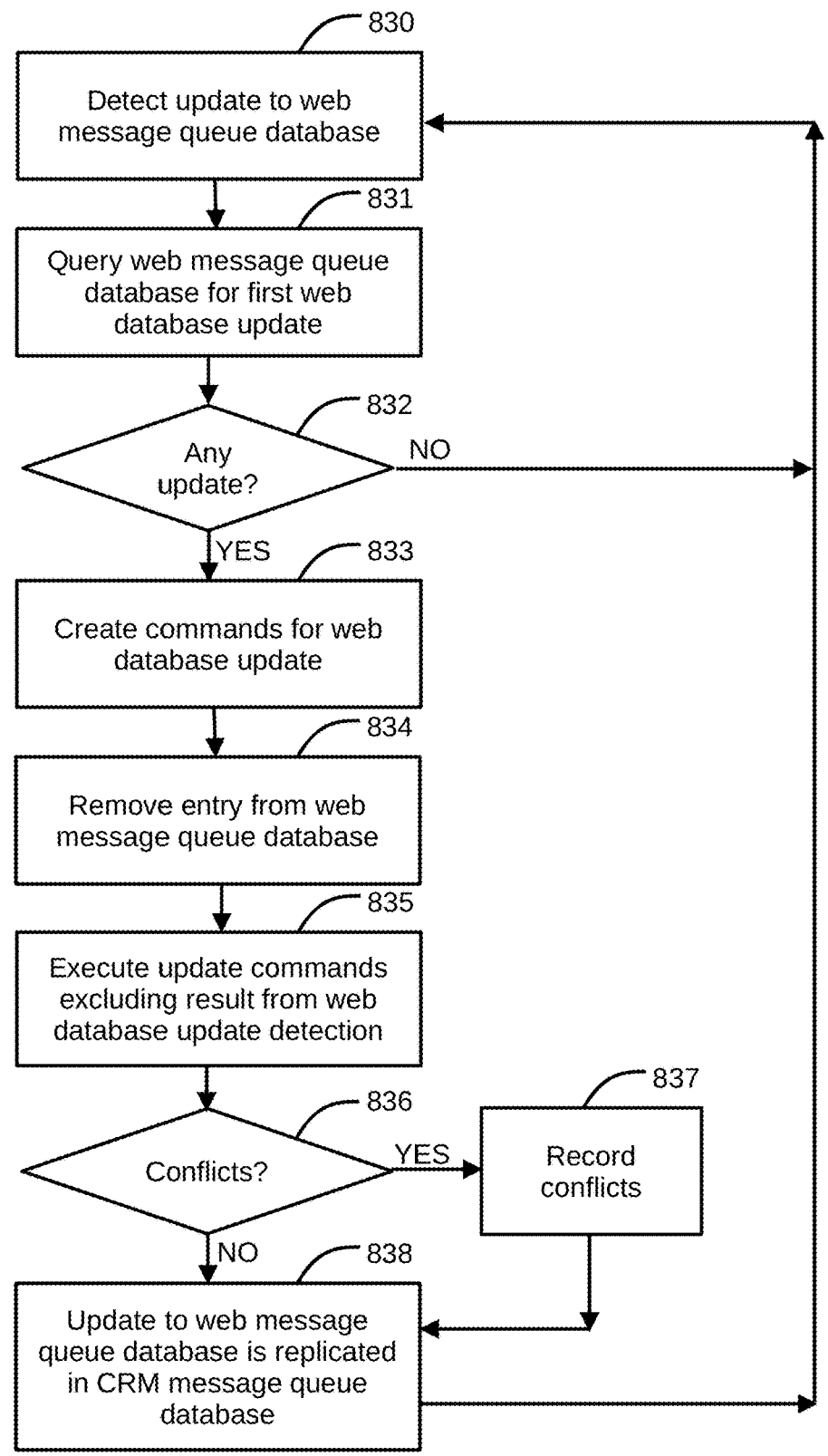
FIG. 8D is a flowchart illustrating the process of using a replicated table as a message queue to incorporate external changes from a CRM database into a web database, in accordance with some embodiments of the present invention.

FIG. 8D is a flowchart illustrating the process of using a replicated table as a message queue to incorporate external changes from a CRM database into a web database, in accordance with some embodiments of the present invention. In step 830, an update to the web message queue database can be detected. For example, the detection may be as a result of a polling operation determining a change in the web message queue database, or it may be done as a result of directly monitoring operations that change the web message queue database. In step 831, the web message queue database can be queried to select the next available update to the web database. In step 832, if the query from step 831 returns no result, the process can return to step 830 to await an update to the web message queue database, otherwise it can proceed to step 833, which can use information from the query result to create a set of commands that can make the update to the web database that is indicated by the result of the query in step 831. In step 834, the result returned by the query in step 831 can be removed from the web message queue database. In step 835, the set of commands created in step 833 can be applied to the web database to replicate the change that originated in the CRM database. The operations applied to the web database by these commands can be excluded from the detection process described by step 821 depicted in FIG. 8C, in order to prevent a loop from forming that repeats replication commands between the two databases. Step 836 can test for any conflicts that arise during the execution of the commands in step 835. For example, a conflict may result if the same value is updated in both the web database and the CRM database before the synchronization happens, but the update values are different in the two databases. If step 836 detects a conflict, then step 837 can record the conflict. In either case, step 838 can replicate the change made to the CRM message queue database in step 834 into the web message queue database.

The web database mentioned in steps 831, 833, and 835 can correspond to the web database 102 depicted in FIG. 1. The web message queue database mentioned in steps 830, 831, 834, and 838 can correspond to the message queue 508 depicted in FIG. 5. The CRM message queue database mentioned in step 838 can correspond to the message queue 507 depicted in FIG. 5.

Figure 9:
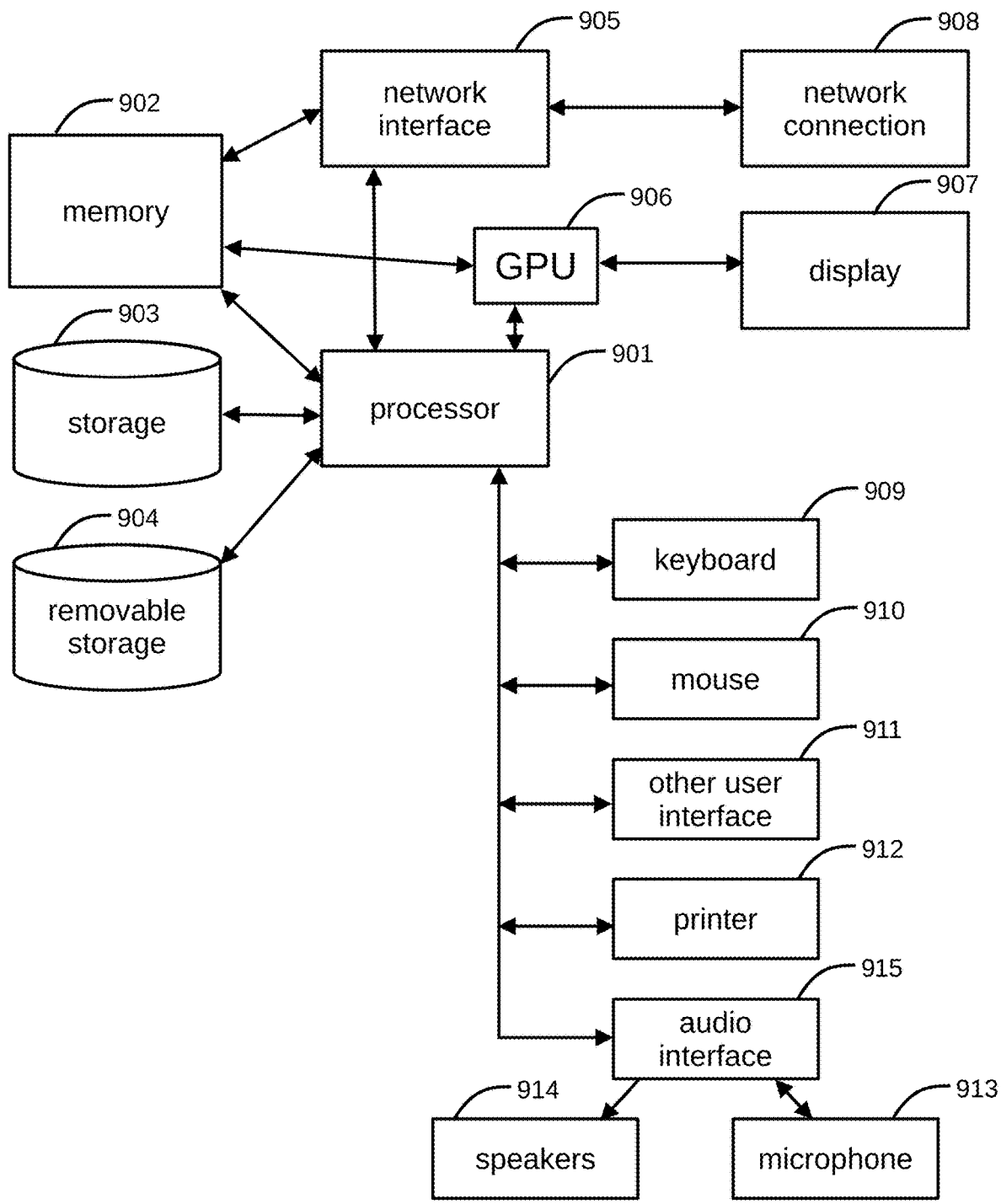
FIG. 9 is a block diagram illustrating the architecture for a computing device, in accordance with some embodiments of the present invention.

FIG. 9 is a block diagram illustrating the architecture for a computing device, in accordance with some embodiments of the present invention. Processor 901 can control the device, and can execute instructions to implement the operating system and applications. The computing device may have multiple instances of the processor 901, and the multiple instances may cooperate to control the device. Memory 902 can store instructions and data for use by the processor 901 and other components. Storage 903 can also store instructions and data and may implement the storage in a way that allows more storage but slower access than memory 902. Removable storage 904 can also store instructions and data and may be removed from and connected to the computing device. Peripherals 907-914 can include a network connection 908, display 907, keyboard 909, mouse 910, other user interface peripherals 911, printer 912, microphone 913, speakers 914, and any other peripherals (not pictured) used by the computing device. The computing device may also have multiple instances of any of these peripherals 907-914. The network connection 908 may provide access to a computer network. The display 907 may provide a visual display of data. The keyboard 909 may allow character input of data. The mouse 910 may allow spatial input of data. The printer 912 may provide hard copy output of data. The microphone 913 may allow audio input of data. The speakers 914 may provide audio output of data. Additional peripherals 911 may include any other types of implementations to provide input or output of data, such as joysticks, cameras, gyroscopes, and so on. The network interface 905 may manage the data transfers between the network connection 908 and the processor 901 and memory 902. The graphic processing unit (GPU) 906 may manage data transfers between the display 907 and the processor 901 and memory 902. The GPU 906 may also be used by the processor 901 as a coprocessor. The audio interface 915 may manage the data transfers between the microphone 913 and speakers 914 and the processor 901 and memory 902.

The computing device depicted in FIG. 9 may correspond to devices that operate the CRM system 104 and the e-commerce implementation 107 depicted in FIG. 1, devices that operate the CRM system 201 and web sites 206a-206c depicted in FIG. 2, and devices that operate the CRM system 604, e-commerce implementation 607, payment processors 612, third party integrations 613, point-of-sale implementation 608, POS systems 610a-610c, and POS peripherals 611a-611e in FIG. 6, along with any other computing devices that are implicitly or explicitly described in this disclosure.

The one or more computing devices described above do not need to be physically proximate to each other or in the same machine farm. Thus, the computing devices logically grouped as a machine farm may be interconnected using a wide-area network (WAN) connection or a metropolitan-area network (MAN) connection. For example, a machine farm may include computing devices physically located in different continents or different regions of a continent, country, state, city, campus, or room. Data transmission speeds between computing devices in the machine farm can be increased if the computing devices are connected using a local-area network (LAN) connection or some form of direct connection.

Management of the computing devices may be de-centralized. For example, one or more computing devices may comprise components, subsystems and circuits to support one or more management services. In one of these embodiments, one or more computing devices provide functionality for management of dynamic data, including techniques for handling failover, data replication, and increasing robustness. Each computing device may communicate with a persistent store and, in some embodiments, with a dynamic store.

A computing device may include a desktop computer, laptop computer, notebook computer, tablet computer, mobile or portable computer, mobile phone, smartphone, personal digital assistant (PDA), Internet of Things (IoT) device, wearable device, file server, application server, web server, proxy server, appliance, network appliance, gateway, gateway server, virtualization server, deployment server, secure sockets layer virtual private network ("SSL VPN") server, firewall, or any other computing device. In one embodiment, the computing device may be referred to as a remote machine or a node. In one embodiment, the computing device may be referred to as a cloud.

The one or more computing devices described above may communicate using a network. The network can include a local-area network (LAN), such as a company Intranet, a metropolitan area network (MAN), or a wide area network (WAN), such as the Internet or the World Wide Web. In some embodiments, there are multiple networks between the devices and the computing devices. In one of these embodiments, the network may be a public network, a private network, or may include combinations of public and private networks.

The network may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network may include a wireless link, such as an infrared channel or satellite band. The topology of the network may include a bus, star, or ring network topology. The network may include mobile telephone networks utilizing any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). In some embodiments, different types of data may be transmitted via different protocols. In other embodiments, the same types of data may be transmitted via different protocols.

The system and its components, such as the one or more computing devices described above, may include hardware elements, such as one or more processors, logic devices, or circuits. For example, the system and its components may include a bus or other communication component for communicating information and a processor or processing circuit coupled to the bus for processing information. The hardware elements can also include one or more processors or processing circuits coupled to the bus for processing information. The system also includes main memory, such as a random-access memory (RAM) or other dynamic storage device, coupled to the bus for storing information, and instructions to be executed by the processor. Main memory can also be used for storing position information, temporary variables, or other intermediate information during execution of instructions by the processor. The system may further include a read only memory (ROM) or other static storage device coupled to the bus for storing static information and instructions for the processor. A storage device, such as a solid-state device, magnetic disk or optical disk, can be coupled to the bus for persistently storing information and instructions.

According to various embodiments, the processes described herein can be implemented by the system or hardware components in response to the one or more processors executing an arrangement of instructions contained in memory. Such instructions can be read into memory from another computer-readable medium, such as a storage device.

Execution of the arrangement of instructions contained in memory causes the system to perform the illustrative processes described herein. One or more processors in a multi-processing arrangement may also be employed to execute the instructions contained in memory. In alternative embodiments, hard-wired circuitry may be used in place of or in combination with software instructions to effect illustrative embodiments. Thus, embodiments are not limited to any specific combination of hardware circuitry and software. To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, i.e., one or more circuits of computer program instructions, encoded on one or more computer storage media for execution by or to control the operation of data processing apparatus. Alternatively, or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The computer storage medium can also be a storage device on an intermediate server in a content distribution network (CDN), or on an edge computing device in a cloud implementation.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as Python, JavaScript, PHP, Go, Ruby, Ruby on Rails, Rust, Swift, Objective C, LISP, Perl, BASIC, Visual Basic, R, C, C++, C#, Prolog, FORTRAN, COBOL, APL, or in any byte code language such as Java, or in any database implementation language such as SQL. The software programs may be stored on or in one or more articles of manufacture as object code.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated in a single software product or packaged into multiple software products.

References to "or" may be construed as inclusive so that any terms described using "or" may indicate any of a single, more than one, and all of the described terms.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain embodiments, multitasking and parallel processing may be advantageous.

While this specification contains many specific implementation details, these should not be construed as limitations on the scope of any inventions or of what may be claimed, but rather as descriptions of features specific to particular implementations of particular inventions. Certain features described in this specification in the context of separate embodiments can also be implemented in combination in a single embodiment. Conversely, various features described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A method for synchronizing a first database and a second database comprising:
   storing the first database in a first memory of a first computing device, and the second database in a second memory of a second computing device;
   detecting a first update to the first database;
   creating, based on the detecting, a first message queue item;
   inserting the first message queue item into a first message queue database on the first computing device;
   replicating the first message queue item from the first message queue database to a second message queue item in a second message queue database on the second computing device;
   selecting the second message queue item from the second message queue database; and
   updating, based on the selecting, the second database to correspond to the first update;
   wherein the replicating of the first message queue item comprises:

detecting the insertion of the first message queue item into the first message queue database;
creating a first queue update object representing the insertion of the first message queue item into the first message queue database;
transmitting the first queue update object to the second message queue database; and
applying the first queue update object to the second message queue database to insert the second message queue item into the second message queue database;
wherein the selecting of the second message queue item from the second message queue database comprises:
detecting the presence of the second message queue item; and
removing the second message queue item from the second message queue database; and
wherein the updating of the second database comprises:
creating a first database update object representing the first update to the first database; and
applying the first database update object to the second database;
wherein the first database update object represents an action selected from the group consisting of a change to a value in the first database, an insertion of a first record into the first database, a deletion of a second record from the first database, an addition to a schema of the first database, and a deletion from the schema of the first database.

2. The method of claim 1, further comprising:
detecting a second update to the second database;
creating, based on the detecting of the second update, a third message queue item;
inserting the third message queue item into the second message queue database;
replicating the third message queue item from the second message queue database to a fourth message queue item in the first message queue database;
selecting the fourth message queue item from the first message queue database; and
updating, based on the selecting of the fourth message queue item, the first database to correspond to the second update.

3. The method of claim 2, wherein the replicating of the third message queue item comprises:
detecting the insertion of the third message queue item into the second message queue database;
creating a second queue update object representing the insertion of the third message queue item into the second message queue database;
transmitting the second queue update object to the first message queue database; and
applying the second queue update object to the first message queue database to insert the fourth message queue item into the first message queue database;
wherein the selecting of the fourth message queue item from the first message queue database comprises:
detecting the presence of the fourth message queue item; and
removing the fourth message queue item from the first message queue database; and
wherein the updating of the first database comprises:
creating a second database update object representing the second update to the second database; and
applying the second database update object to the first database.

4. The method of claim 3, wherein the second database update object represents an action selected from the group consisting of a change to a value in the second database, an insertion of a first record into the second database, a deletion of a second record from the second database, an addition to a schema of the second database, and a deletion from the schema of the second database.

5. The method of claim 1, wherein:
the detecting of the first update comprises receiving a trigger based on an external input; and
the updating of the second database comprises a synchronization of the first database and the second database.

6. The method of claim 2, wherein:
the detecting of the second update comprises receiving a trigger based on an external input; and
the updating of the first database comprises a synchronization of the first database and the second database.

7. The method of claim 1, further comprising:
accessing the first database by a customer relationship management system; and
accessing the second database by an entity selected from the group consisting of an e-commerce system and a point-of-sale system.

8. The method of claim 1, wherein the detecting comprises:
a first polling of the first database;
a second polling of the first database; and
detecting, based on a difference between the first polling and the second polling, the first update.

9. The method of claim 1, wherein the detecting comprises:
receiving, based on an access to the first database, a trigger;
determining, based on the trigger, a change to the first database; and
detecting, based on the determination, the first update.

10. A system for synchronizing a first database and a second database comprising:
a first computing device including a first processor and a first memory, and a second computing device including a second processor and a second memory, the first and second computing devices configured to:
store the first database in the first memory and the second database in the second memory;
detect a first update to the first database;
create, based on the detecting, a first message queue item;
insert the first message queue item into a first message queue database on the first computing device;
replicate the first message queue item from the first message queue database to a second message queue item in a second message queue database on the second computing device;
select the second message queue item from the second message queue database; and
update, based on the selecting, the second database to correspond to the first update;
wherein the replicating of the first message queue item comprises:
detecting the insertion of the first message queue item into the first message queue database;
creating a first queue update object representing the insertion of the first message queue item into the first message queue database;
transmitting the first queue update object to the second message queue database; and
applying the first queue update object to the second message queue database to insert the second message queue item into the second message queue database;

wherein the selecting of the second message queue item from the second message queue database comprises:
  detecting the presence of the second message queue item; and
  removing the second message queue item from the second message queue database; and
wherein the updating of the second database comprises:
  creating a first database update object representing the first update to the first database; and
  applying the first database update object to the second database;
  wherein the first database update object represents an action selected from the group consisting of a change to a value in the first database, an insertion of a first record into the first database, a deletion of a second record from the first database, an addition to a schema of the first database, and a deletion from the schema of the first database.

11. The system of claim 10, wherein the first and second computing devices are further configured to:
  detect a second update to the second database;
  create, based on the detecting, a third message queue item;
  insert the third message queue item into the second message queue database;
  replicate the third message queue item from the second message queue database to a fourth message queue item in the first message queue database;
  select the fourth message queue item from the first message queue database; and
  update, based on the selecting, the first database to correspond to the second update.

12. The system of claim 11, wherein the replicating of the third message queue item comprises:
  detecting the insertion of the third message queue item into the second message queue database;
  creating a second queue update object representing the insertion of the third message queue item into the second message queue database;
  transmitting the second queue update object to the first message queue database; and
  applying the second queue update object to the first message queue database to insert the fourth message queue item into the first message queue database;
wherein the selecting of the fourth message queue item from the first message queue database comprises:
  detecting the presence of the fourth message queue item; and
  removing the fourth message queue item from the first message queue database; and
wherein the updating of the first database comprises:
  creating a second database update object representing the second update to the second database; and
  applying the second database update object to the first database.

13. The system of claim 12, wherein the second database update object represents an action selected from the group consisting of a change to a value in the second database, an insertion of a first record into the second database, a deletion of a second record from the second database, an addition to a schema of the second database, and a deletion from the schema of the second database.

14. The system of claim 10, wherein:
  the detecting of the first update comprises receiving a trigger based on an external input; and
  the updating of the second database comprises a full synchronization of the first database and the second database.

15. The system of claim 11, wherein:
  the detecting of the second update comprises receiving a trigger based on an external input; and
  the updating of the first database comprises a full synchronization of the first database and the second database.

16. The system of claim 10, wherein the first and second computing devices are further configured to:
  access the first database by a customer relationship management system; and
  access the second database by an entity selected from the group consisting of an e-commerce system and a point-of-sale system.

17. The system of claim 10, wherein the detecting comprises:
  a first polling of the first database;
  a second polling of the first database; and
  detecting, based on a difference between the first polling and the second polling, the first update.

18. The system of claim 10, wherein the detecting comprises:
  receiving, based on an access to the first database, a trigger;
  determining, based on the trigger, a change to the first database; and
  detecting, based on the determination, the first update.

19. A non-transitory computer-readable medium having data stored therein representing software executable by a computer, the software including instructions for synchronizing a first database and a second database comprising:
  storing the first database in a first memory of a first computing device, and the second database in a second memory of a second computing device;
  detecting a first update to the first database;
  creating, based on the detecting, a first message queue item;
  inserting the first message queue item into a first message queue database on the first computing device;
  replicating the first message queue item from the first message queue database to a second message queue item in a second message queue database on the second computing device;
  selecting the second message queue item from the second message queue database; and
  updating, based on the selecting, the second database to correspond to the first update;
wherein the replicating of the first message queue item comprises:
  detecting the insertion of the first message queue item into the first message queue database;
  creating a first queue update object representing the insertion of the first message queue item into the first message queue database;
  transmitting the first queue update object to the second message queue database; and
  applying the first queue update object to the second message queue database to insert the second message queue item into the second message queue database;
wherein the selecting of the second message queue item from the second message queue database comprises:
  detecting the presence of the second message queue item; and
  removing the second message queue item from the second message queue database; and wherein the updating of the second database comprises:
creating a first database update object representing the first update to the first database; and
applying the first database update object to the second database;
wherein the first database update object represents an action selected from the group consisting of a change to a value in the first database, an insertion of a first record into the first database, a deletion of a second record from the first database, an addition to a schema of the first database, and a deletion from the schema of the first database.

20. The non-transitory computer-readable medium of claim 19, the instructions further comprising:
detecting a second update to the second database;
creating, based on the detecting, a third message queue item;
inserting the third message queue item into the second message queue database;
replicating the third message queue item from the second message queue database to a fourth message queue item in the first message queue database;
selecting the fourth message queue item from the first message queue database; and
updating, based on the selecting, the first database to correspond to the second update;
wherein the replicating of the third message queue item comprises:
detecting the insertion of the third message queue item into the second message queue database;
creating a second queue update object representing the insertion of the third message queue item into the second message queue database;
transmitting the second queue update object to the first message queue database; and
applying the second queue update object to the first message queue database to insert the fourth message queue item into the first message queue database;
wherein the selecting of the fourth message queue item from the first message queue database comprises:
detecting the presence of the fourth message queue item; and
removing the fourth message queue item from the first message queue database; and
wherein the updating of the first database comprises:
creating a second database update object representing the second update to the second database; and
applying the second database update object to the first database.

* * * * *